United States Patent
Irwin, Jr. et al.

(10) Patent No.: US 11,394,549 B1
(45) Date of Patent: Jul. 19, 2022

(54) SYSTEM AND METHOD FOR GENERATING A PEPPER'S GHOST ARTIFICE IN A VIRTUAL THREE-DIMENSIONAL ENVIRONMENT

(71) Applicant: 8 Bit Development Inc., Mesa, AZ (US)

(72) Inventors: Kenneth E. Irwin, Jr., Dawsonville, GA (US); Eric M. Pilnock, Mesa, AZ (US); Michael T. Day, Mesa, AZ (US)

(73) Assignee: 8 BIT DEVELOPMENT INC., Mesa, AZ (US)

( * ) Notice: Subject to any disclaimer, the term of this patent is extended or adjusted under 35 U.S.C. 154(b) by 0 days.

(21) Appl. No.: 17/581,152

(22) Filed: Jan. 21, 2022

Related U.S. Application Data

(60) Provisional application No. 63/206,048, filed on Jan. 25, 2021.

(51) Int. Cl.
| | |
|---|---|
| *G06K 9/00* | (2022.01) |
| *H04L 9/32* | (2006.01) |
| *G06F 21/10* | (2013.01) |
| *G06V 40/20* | (2022.01) |
| *G06T 17/10* | (2006.01) |
| *G06T 7/20* | (2017.01) |
| *G06F 1/16* | (2006.01) |

(52) U.S. Cl.
CPC .......... *H04L 9/3213* (2013.01); *G06F 1/1694* (2013.01); *G06F 21/10* (2013.01); *G06T 7/20* (2013.01); *G06T 17/10* (2013.01); *G06V 40/23* (2022.01); *G06V 40/28* (2022.01); *H04L 2209/38* (2013.01); *H04L 2209/60* (2013.01)

(58) Field of Classification Search
CPC ............... H04L 9/3213; H04L 2209/38; H04L 2209/60; G06F 1/1694; G06F 21/10; G06T 7/20; G06T 17/10; G06V 40/23; G06V 40/28
See application file for complete search history.

(56) References Cited

U.S. PATENT DOCUMENTS

| | | | |
|---|---|---|---|
| 2009/0202114 A1* | 8/2009 | Morin | G06T 7/246 382/118 |
| 2019/0019336 A1* | 1/2019 | Coggins | A61B 5/369 |
| 2019/0095775 A1* | 3/2019 | Lembersky | G06N 20/00 |
| 2021/0236952 A1* | 8/2021 | Krauthamer | G06T 7/20 |
| 2022/0043277 A1* | 2/2022 | Karafin | H04N 13/122 |

* cited by examiner

*Primary Examiner* — Tom Y Lu
(74) *Attorney, Agent, or Firm* — Panitch Schwarze Belisario & Nadel LLP

(57) ABSTRACT

A system, method, and device for generating Pepper's Ghost artifices from two-dimensional sources including Augmented Reality ("AR") or Virtual Reality ("VR") environments such that the Pepper's Ghost artifices appear to be a natural addition to a three-dimensional virtual environment. By employing virtual Pepper's Ghost projections onto varying size and shaped screens in the virtual three-dimensional environment, a reduction in bandwidth and costs are realized particularly when displaying humanoid characters in an AR and/or VR environment. While the methods disclosed with the present invention could be of utility to any type of virtual environment, the benefits are particularly acute for dynamic VR environments.

14 Claims, 16 Drawing Sheets

SYSTEM AND METHOD FOR GENERATING A PEPPER'S GHOST ARTIFICE IN A VIRTUAL THREE-DIMENSIONAL ENVIRONMENT

CROSS-REFERENCE TO RELATED APPLICATIONS

This application claims priority to U.S. Provisional Patent Application No. 63/206,048 filed Jan. 25, 2021, which is incorporated by reference herein.

FIELD OF THE INVENTION

The present disclosure relates to a system and method for generating a Pepper's Ghost artifice (interchangeably referred to herein as an "artifice") in three-dimensional (3D) virtual environments such that the Pepper's Ghost artifice appears to be a natural addition to the 3D virtual environment. The Pepper's Ghost artifice itself preferably being generated from at least one two-dimensional (2D) video image and projected onto a virtual, preferably topographical, screen thereby enabling multiple viewing angles, heights, and depths thus enhancing the three-dimensional appearance of the Pepper's Ghost artifice in the 3D virtual environment. Specifically, this innovation provides a reduction in bandwidth and costs when displaying humanoid characters in real time in the virtual 3D environment. While the methods disclosed with the present invention could be of utility to any type of virtual environment, the benefits are particularly significant for dynamic Virtual Reality (VR) and Augmented Reality (AR) environments.

BACKGROUND

In 1862 English scientist John Henry Pepper first demonstrated the effect now known as "Pepper's Ghost" to an audience viewing a stage with various objects on it. On his command, ghostly objects appeared to fade in or out of existence in the room and other objects in the room appeared to transform into different objects. Classically, the basic technique demonstrated in 1862 involves a stage that is specially arranged into two rooms, one main room that the audience can see into (i.e., the stage as a whole) and a second hidden room to the side or below, a.k.a. the "blue room." A plate of clear glass (or Plexiglas or plastic film) is placed somewhere in the main room at an angle that reflects the view of the blue room towards the audience. Generally, this is arranged with the blue room to one side of the stage, and the plate of glass on the stage rotated around its vertical axis at 45 degrees. Care must be taken to make the glass as invisible as possible, normally hiding the lower edge in patterning on the floor and ensuring lights do not reflect off it.

When the lights are bright on the stage and dark in the blue room, the reflected image cannot be seen. When the lighting in the blue room is increased, often with the stage lights dimming to make the effect more pronounced, the reflection becomes visible and any illuminated objects within the blue hidden room seem to appear, from thin air, in the space visible to the audience.

For example, FIG. 1A is a side elevation view of a representative example of a traditional, prior art, Pepper's Ghost theatrical demonstration 10. As shown in example 10, a stage 11 is arranged directly in front of an audience 13 with the hidden blue room 12 located below the audience's sightline in this example. Placed on the stage 11 is a sheet of glass 14 ideally mounted at a 45 degree angle relative to the audience's 13 sightline. When the stage 11 is brightly illuminated and the blue room 12 is dark, the glass 14 is completely transparent to the audience 103 thereby allowing them to see whatever is on the stage 11 without any visual enhancement. However, when a ghost actor 16 in the blue room 12 is directly illuminated by a spotlight 17 the light reflected off of the ghost actor 16 bounces off of a blue room mirror 15 (preferably positioned at the same angle as the on stage sheet of glass 14) onto the on-stage sheet of glass 14 creating a translucent image of the ghost actor 18 floating over the stage scene 11.

Of course, through the years the Pepper's Ghost illusion has been enhanced and modified, but the basic principle of partial reflection remained the same. For example, old carnival sideshows would typically feature a "Girl-to-Gorilla" trick where the girl would appear to morph into a gorilla from the perspective of the audience. This trick being a variation of Pepper's Ghost where the hidden blue room may be an identical mirror-image of the main room, so that its reflected image exactly matches the layout of the main room; thus, by gradually lowering the lighting in the main (girl) room while gradually increasing the lighting in the blue (gorilla) room the audience would perceive the girl gradually morphing into the gorilla. Pepper's Ghost illusions are even used today in wide ranging applications from Disney World® or Disney Land's® "Haunted Mansion" ghost organist player to the late singer Michael Jackson appearing at the Billboard Music Awards performing the song "Slave To The Rhythm" from his posthumous album as millions watched from home in May of 2014 (Forbes Magazine "Man In The Translucent Material: How Virtual Michael Jackson Came To Be", 24 Jun. 2014).

Various embodiments of Pepper's Ghost are well known in the art. Notably, U.S. Pat. No. 7,883,212 (O'Connell et al.); U.S. Pat. No. 8,262,226 (LaDuke et al.); and U.S. Pat. No. 8,692,738 (Smithwick et al.) as well as U.S. Patent Application Publication No. 2016/0266543 (Crowder et al.). However, O'Connell discloses (see FIG. 1B reproduced from FIG. 1 of O'Connell) "An image projection apparatus (100) comprises a projector 106), a frame (108), and a partially transparent screen (110) . . . (where) The projector (106) projects an image such that light forming the image impinges upon the screen (11) such that a virtual image is created from light reflected from the screen (110), the virtual image appearing to be located behind the screen (110)" (Abstract) and is therefore only applicable to physical (real world) embodiments.

Although LaDuke also concerns itself with real world embodiments, LaDuke specifically discloses a " . . . method of generating a Pepper's ghost illusion involving an image generation platform, such as a computer providing an anamorphically-distorted image coupled with some form of display projects an image (sic.), directly or indirectly on a spherical medium" (Abstract). For example, FIG. 1C (reproduced from FIG. 3 of LaDuke) illustrates an exemplary anamorphic Pepper's Ghost illusion assembly 30 with an electronic image generator 32 in the form of a flat panel display 36 configured to display an anamorphic-distorted image 44. The image generator 32 is positioned adjacent to a hemispherical clear plastic medium 34 that is both reflective and transparent in a manner sufficient to achieve the Pepper's Ghost illusion. The hemispherical clear plastic medium 34 includes a lower portion 38 and a circular dark ambient light blocking cover 42. During operation, the image generator 32 displays or projects a distorted image 44 upwardly toward the hemispherical medium 34 (for simplicity, the projected image is a ring) resulting in a non-distorted image 46 being displayed on the hemispherical clear plastic medium 34.

Like O'Connell and LaDuke, Smithwick also addresses projections of Pepper's Ghost in real world embodiments, however Smithwick discloses a " . . . dynamic mask display element for selectively providing an opaque or semi-opaque mask with a shape matching or selected to match a portion of the virtual object . . . " (column 3, lines 9 thru 11), thereby enabling a Pepper's Ghost projection to appear "opaque." Finally, the (now abandoned) Crowder application teaches systems and methods to enhance the Pepper's Ghost's appearance simulating a three-dimensional object by projecting onto topography (raised portions) as shown in FIG. 1D (reproduced from FIG. 9 of Crowder). In FIG. 1D, the image source 270 is contoured (portion 271*a*) to the three-dimensional shape of a human face. By then projecting an image of a human face 271*b* onto the image source 271*a* results in a holographic like image 275 appearing on the foil frame 220 as seen by the viewer 260 over the background 250 having the appearance of realistic depth perspective.

Thus, all of the aforementioned prior art embodiments were concerned with projecting Pepper's Ghost in the real physical world, while being completely silent on Pepper's Ghost embodiments in virtual worlds typical of AR and VR environments. In AR and VR embodiments there remains a need to project or insert interactive and animated objects, particularly humanoid appearing objects, into a virtual environment. This need is particularly acute, due principally to bandwidth limitations when displaying in real time a familiar humanoid character in a virtual environment (e.g., a familiar friend appearing at a virtual Craps table) that interacts with the user operating an AR, VR, or 2D display (e.g., laptop computer) device. This bandwidth limitation is principally the reason that the ability to have multiple virtual reality users appear to each other in real time within the same virtual environment is generally not implemented to date.

Hence, there remains a need for improved AR, VR, or 2D display visual display techniques and mechanisms for creating or projecting three-dimensional images in virtual environments. Preferably, such an advanced virtual Pepper's Ghost display system would be capable of providing higher contrast, opaque appearing, and three-dimensional interactive virtual objects or characters that can be interspersed or located among/between various virtual environmental entities or scenes such as foreground and background entities or scenes while requiring little transmission and/or processing bandwidth, which heretofore has not been realized with the prior art.

SUMMARY OF THE INVENTION

Objects and advantages of the present invention will be set forth in part in the following description, or may be obvious from the description, or may be learned through practice of the present invention.

In a general aspect of the invention, a method and system are provided for enabling Pepper's Ghost projections in completely virtual environments. These Pepper's Ghost projections being typically based on at least one two-dimensional ("2D") source video image that is virtually projected onto at least one virtual screen surface placed strategically in the virtual 2D or 3D environment. Preferably, the screen surface(s) are not simple flat planes, but more geometrically complex 3D objects (e.g., hemispherical, conic sections, topography surfaces generally resembling a human body) with the associated 2D source images undergoing an anamorphic process to conform to the shape and size of the screen surfaces. The invention therefore building on the foundation of real world established prior art Pepper's Ghost embodiments, effectively transferring these embodiments into 3D virtual environments resulting in higher quality appearing interactive virtual projections that can be animated in real time with little bandwidth required.

In a general embodiment, a method and system are provided for creating 3D appearing Pepper's Ghost artifices in 3D virtual environments typically from live feed 2D images that may only partially depict the human subject of the artifice. With this general embodiment, the live feed 2D images (e.g., a person's face seated at a table) are typically transformed into anamorphic images projected onto at least one virtual geometric screen surface that is strategically placed within a virtual environment (e.g., live video feeds of a plurality of people's faces attending a virtual meeting being displayed on screens positioned around a virtual conference table). In a specific aspect to this general embodiment, various 2D images of the same object (e.g., a person's face) are prerecorded or prerendered from different perspectives (e.g., sides of a person's face) and seamlessly stitched to a live 2D image feed such that the prerecorded or rendered 2D portions and the live 2D image appear on different virtual screen surfaces that are arranged such that the various portions seamlessly blend into each other, thereby creating a 3D appearing Pepper's Ghost artifice from a combination of live and prerecorded or prerendered 2D images.

In an alternate embodiment, a plurality of prerecorded and/or prerendered 2D images are first stored via a separate process into a database where the prerecorded and/or prerendered 2D images are arranged in groups of different perspectives of the same subject with each perspective image including metadata indicating its position relative to the other perspectives. The database of prerecorded and/or prerendered varying 2D perspective images of various subjects is then accessed by subject to construct 3D appearing Pepper's Ghost artifices where any anamorphic modifications of the constructed images is subsequently performed with respect to the size and topology of the Pepper's Ghost screen surfaces selected for the subject's projections into the virtual environment. In an optional and preferred addition to the alternate embodiment, the prerecorded and/or prerendered 2D grouped subject images may be animated to create dynamic Pepper's Ghost artifices. In a specific embodiment, this animation may be triggered in real time by a subjected human user of the virtual environment—e.g., hands and arms motion of the human subject user causing the corresponding Pepper's Ghost artifice's hands and arms to move in a similar manner, eye motion detected by the subject human user's VR headgear causing the corresponding Pepper's Ghost artifice's eyes and possibly body to move in the same direction—e.g., the subjected human user walking in a direction causing the Pepper's Ghost artifice to walk in a similar direction in the virtual 3D environment, etc. This alternate optional embodiment having the advantage of lower bandwidth requirements for communicating with remote AR, VR, or 2D (e.g., laptop computer) devices.

In an alternate related embodiment, a plurality of virtual geometric screen surfaces are placed within a 3D virtual environment, such that a correlated 2D Pepper's Ghost artifice virtually projected artifice may appear to move within the 3D virtual environment by rapidly sequencing which virtual screen the 2D Pepper's Ghost artifice is virtually projected. In another related embodiment, portions of the 2D Pepper's Ghost artifice are distributed over a plurality of virtual geometric screen surfaces placed within a 3D virtual environment such that the perception of a 3D object is enhanced.

Described are a number of mechanisms and methodologies that provide practical details for enabling Pepper's Ghost artifices in virtual environments with low bandwidth requirements. Ideally, these mechanisms and methodologies provide animated humanoid Pepper's Ghost artifices, enabling interactions with multiple users.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
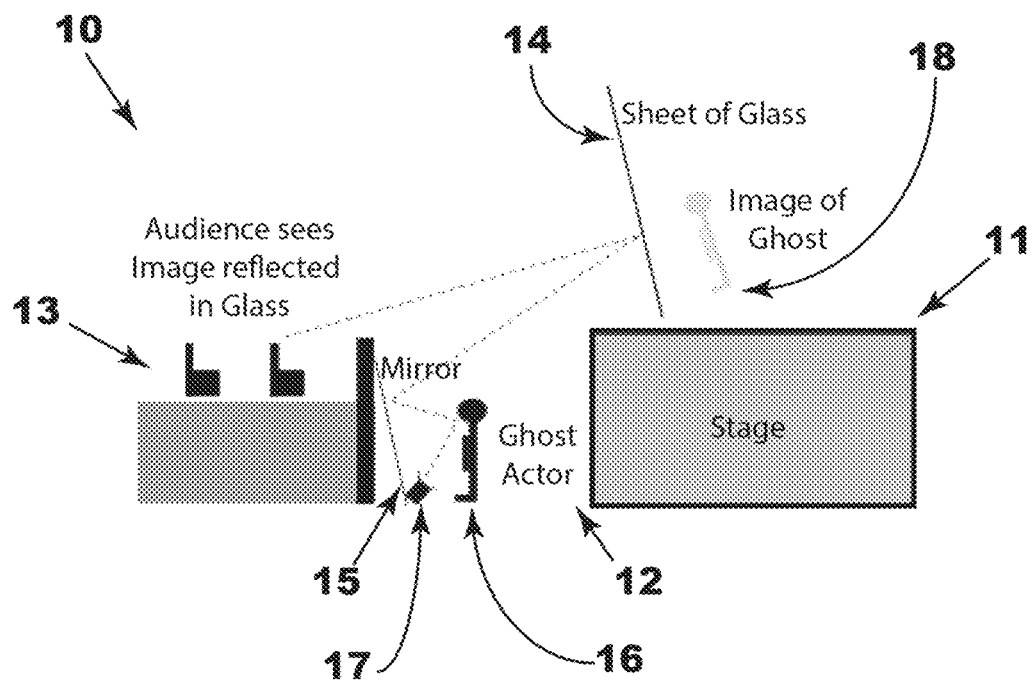
FIG. 1A is a side elevation view of a representative example of a traditional, prior art, Pepper's Ghost mechanism for creating an artifice on stage in the real world.
Figure 1B:
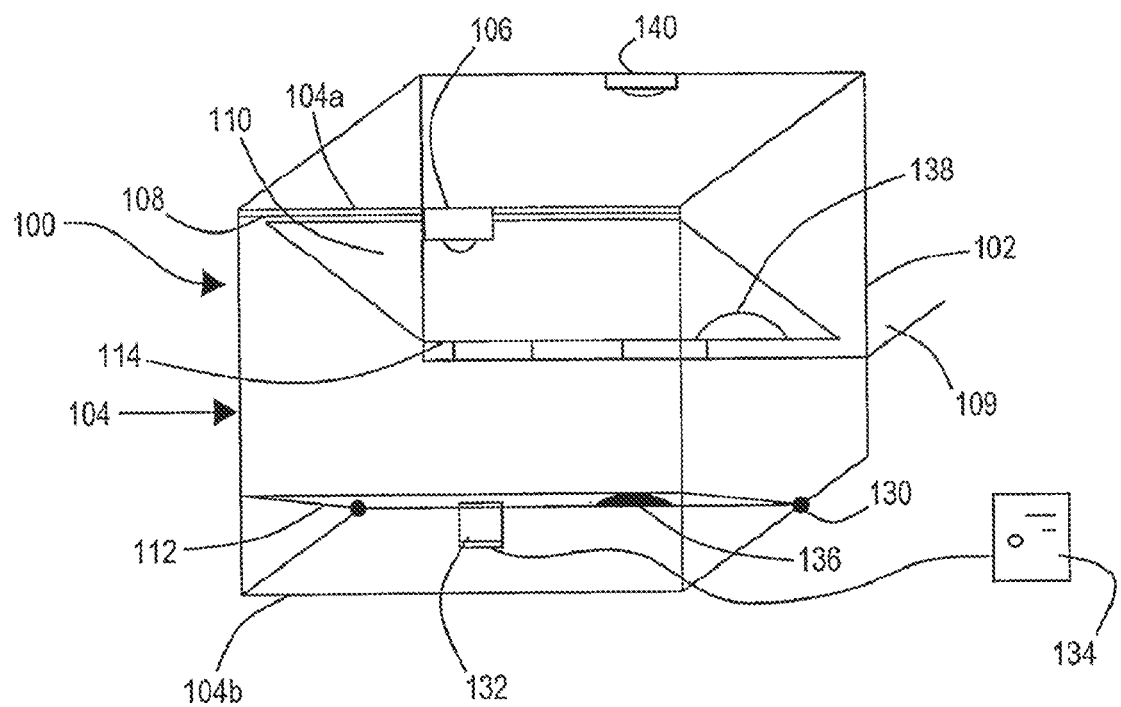
FIG. 1B is a representative example isometric view copied from U.S. Pat. No. 7,883,212 showing a prior art Pepper's Ghost screen mechanism.
Figure 1C:
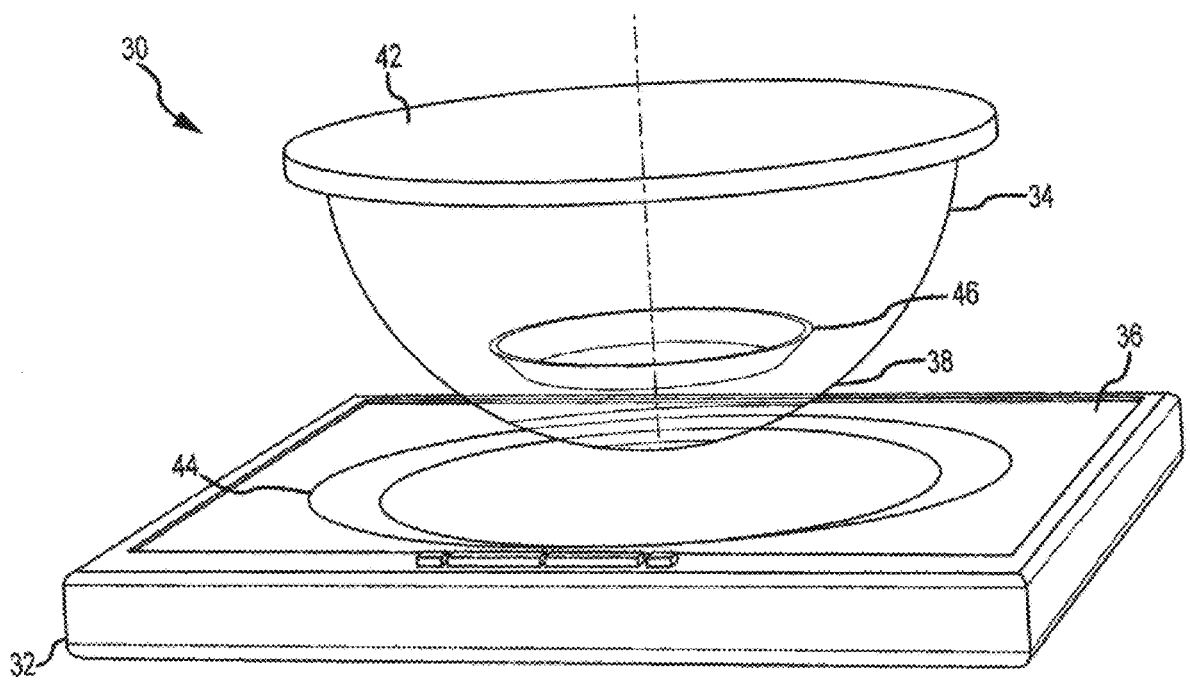
FIG. 1C is a representative example isometric view copied from U.S. Pat. No. 8,262,226 showing a prior art Pepper's Ghost hemispherical screen mechanism and associated artifice in the real world.
Figure 1D:
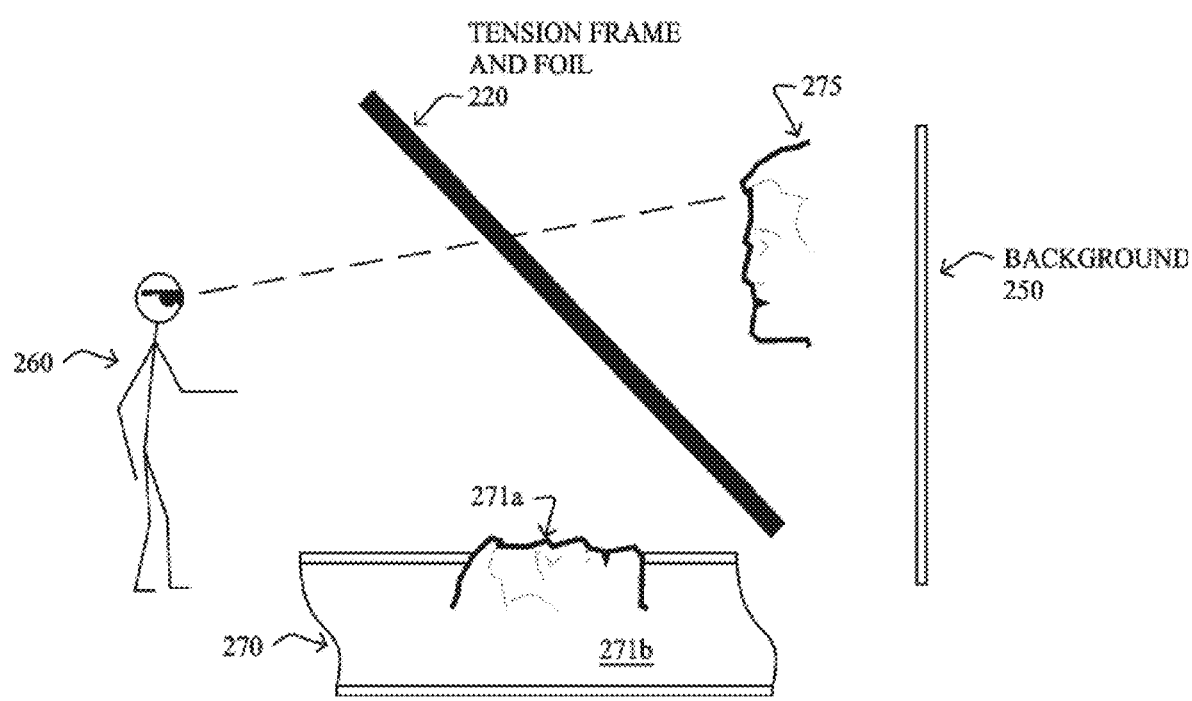
FIG. 1D is a representative example isometric view copied from U.S. Patent Application Publication No. 2016/0266543 showing a prior art Pepper's Ghost topographical screen mechanism and associated artifice in the real world.

Certain terminology is used herein for convenience only and is not to be taken as a limitation on the present invention. The words "a" and "an", as used in the claims and in the corresponding portions of the specification, mean "at least one." The abbreviations "AR" and "VR" denote "Augmented Reality" and "Virtual Reality" respectively. Augmented Reality (AR) is an interactive experience of a real-world environment whose elements are "augmented" by computer-generated perceptual information. While definitions of AR vary depending on the application, in the context of this invention AR denotes constructive (i.e., additive to the natural environment) overlaid visual and possibly audible sensory information seamlessly interwoven into images of the real world. Examples of existing AR platforms are: Apple iPhones®, Android® phones, Google Glass, Microsoft HoloLens, etc. AR augmented computer-generated perceptual information is referred to as "persistent digital objects", or "overlay images", or "visual digital image overlays" interchangeably throughout the specification and claims. Virtual Reality (VR) is an interactive computer-generated experience taking place completely within a simulated environment. VR as used in the claims and in the corresponding portions of the specification denotes complete immersion into the computer-generated experience with no real world environment admitted and may also include audio. Examples of existing VR platforms are: Oculus, Windows Mixed Reality, Google Daydream, SteamVR headsets such as the HTC Vive & Vive Pro, etc.

A "wager" or "bet" are used interchangeably in the claims and in the corresponding portions of the specification meaning a gamble on predicting the outcome of an event in the future—e.g., sporting event, dice throw, roulette wheel outcome. Additionally, the terms "user," "player," or "consumer" are also used interchangeably all referring to a human individual utilizing the invention.

Reference will now be made in detail to examples of the invention, one or more embodiments of which are illustrated in the drawings. Each example is provided by way of explanation of the invention, and not meant as a limitation of the invention. For example, features illustrated or described as part of one embodiment, may be used with another embodiment to yield still a further embodiment. It is intended that the present invention encompass these and other modifications and variations come within the scope and spirit of the invention.

Figure 2A:
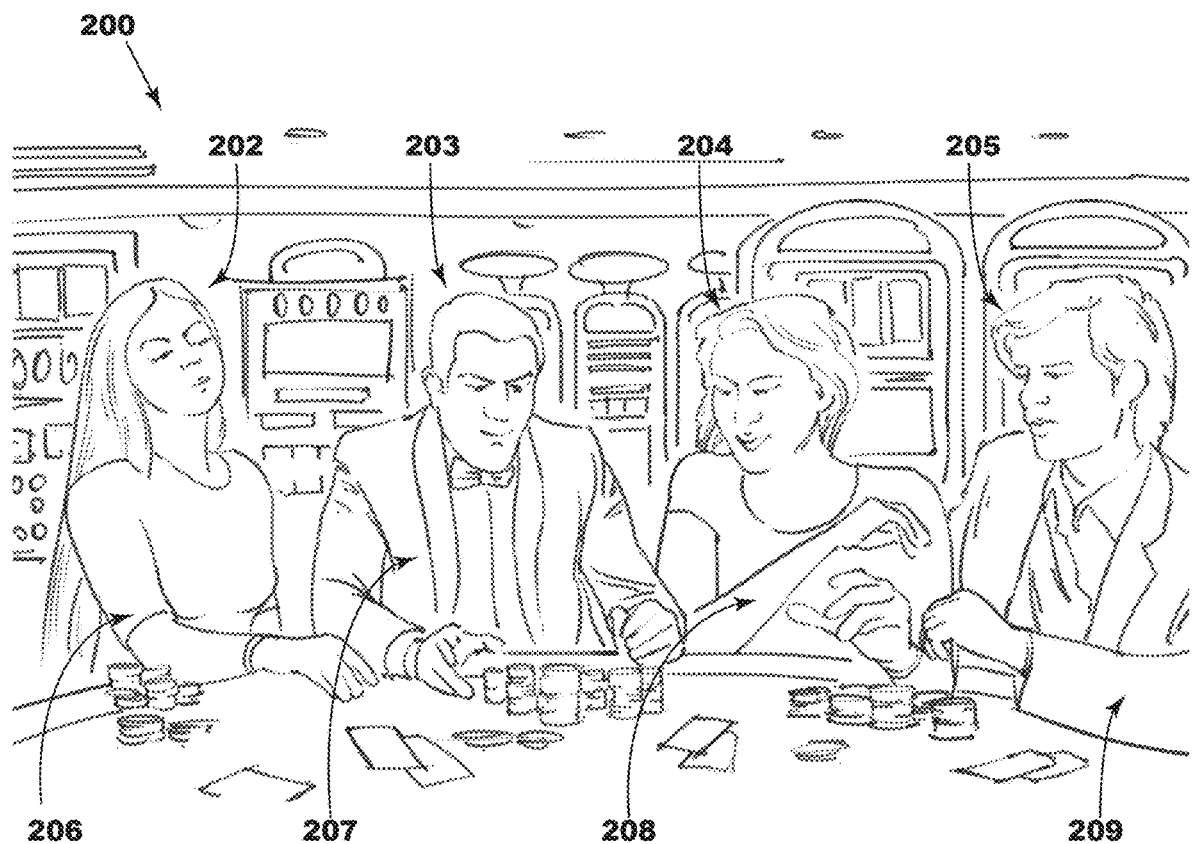
FIG. 2A is a representative example isometric view of a simulated 3D virtual casino poker environment including four virtual player images comprised of a combination of 2D anamorphic projected live feed videos as well as prerecorded or prerendered images thereby creating dynamic Pepper's Ghost artifices in 3D.
Figure 2B:
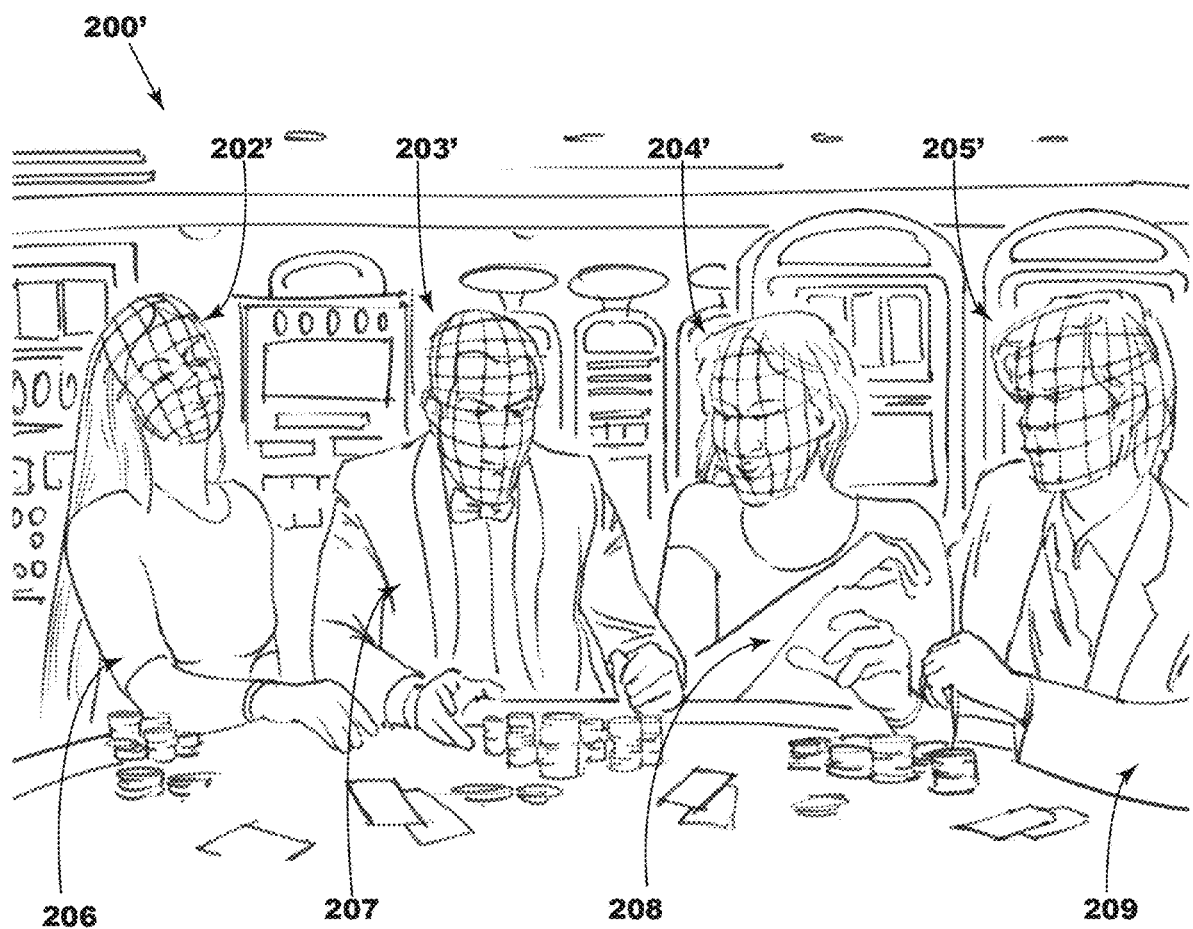
FIG. 2B is a second representative example isometric view of the simulated 3D virtual casino poker environment of FIG. 2A with the four topographical Pepper's Ghost virtual facial screens shown highlighted with the anamorphic Pepper's Ghost virtual facial projections shown in the background.

FIGS. 2A and 2B taken together, provide an exemplary embodiment in which four different live 2D video facial images are coordinated with four different associated prerecorded and/or prerendered body facsimiles in a simulated 3D virtual casino poker environment. The resulting composite four virtual player images consequently being comprised of a combination of 2D projected anamorphic live feed facial video images onto virtual topographical screens combined with the associated body facsimile resulting in four different 3D appearing Pepper's Ghost artifices in the VR environment (202 thru 205 of FIG. 2A). FIG. 2A showing how the four virtual Pepper's Ghost artifices would appear to an additional human player and FIG. 2B displaying the same perspective as FIG. 2A with the four virtual topographical Pepper's Ghost facial projection screens (202' thru 205') highlighted.

FIG. 2A illustrates a simulated 3D casino environment 200 with four virtual players seated (202 thru 205) around a poker table from the perspective of a fifth human player (not shown in FIG. 2A). While the four virtual players seated around the poker table appear to be four discrete homogeneous images, each virtual player is comprised of a composite of a prerecorded and/or prerendered body (206 thru 209) model in congruence with an anamorphic live 2D video feed face (202 thru 205) projected onto a topographical virtual face screen sized and positioned with respect to the associated prerecorded and/or prerendered body (206 thru 209). Thus, in this exemplary embodiment, the anamorphic live feed facial images virtually projected onto a topographical virtual screen (202 thru 205) are combined with the prerecorded and/or prerendered body (206 thru 209) portions that move in congruence creating 3D appearing Pepper's Ghost artifices in a VR environment where interactions with other human players comprises anamorphic live feed 2D facial visual video (202 thru 205) as well as prerecorded and/or prerendered body facsimiles (206 thru 209).

Thus, with the disclosures of this invention, each human player or observer is now transmitting and receiving body language nonverbal communication based on facial expressions and body movements (such as gestures, posture, and facial expressions) of the other players in addition to verbal communications, thereby enabling enhanced virtual human-to-human interaction previously unknown in the art. Preferably, in addition to live video feed facial Pepper's Ghost body language feedback projections (202 thru 205), this exemplary embodiment would also enable the coupled prerecorded and/or prerendered body (206 thru 209) facsimiles to move in concordance with the associated human player's body motions.

This is a significant advancement in the art, as stated in the Mehrabian's Communication Model, human-to-human communications are generally governed by the 7%, 38%, 55% rule—i.e., total information communicated from human-to-human typically consists of only 7% of the literal content of the message with the tone, intonation, and volume conveying another 38% of the information; and, as much as 55% of the information exchanged consisting of body language visual communications. Consequently, by enabling visual body language feedback from human player-to-player as disclosed herein, new levels of player interactions are achieved by typically broadcasting over 50% of human interaction information that has previously been absent in the art. Hence, the virtual human-to-human interactive experience is greatly enhanced, possibly altering game play where player-to-player feedback is essential (e.g., Poker) while at the same time requiring little additional processing and communications bandwidth.

This concordance of an anamorphic live 2D video feed of at least a portion of real world human players with prerecorded and/or prerendered body parts optionally moving in synchronization with the real world human player results in more realistic 3D Pepper's Ghost artifices of people in a 3D virtual environment with substantially more human visual information communicated from player-to-player. More to the point, these realistic 3D Pepper's Ghost artifices of people with substantially more feedback are provided at a cost of very little additional bandwidth requirements, since only 2D live video feeds are required of typically portions of human player's bodies (e.g., faces) with optional additional body motion metrics transmitted from each player's local device to a central site for composition and relaying to the other player's devices. Additionally, the relaying and processing to other players' devices of the anamorphic live 2D video feeds and optional body motion metrics do not typically pose a significant communications bandwidth or processing burden on the other player's devices, the central site, and the associated Internet connections.

FIG. 2B illustrates the same representative example isometric perspective of the simulated 3D virtual casino poker environment 200' of FIG. 2A with the four topographical Pepper's Ghost virtual facial screens (202' thru 205') shown highlighted with the anamorphic Pepper's Ghost virtual projections appearing blended for reference. From the FIG. 2B illustration 200', it can be seen that the four 3D appearing Pepper's Ghost artifices are a composite of live feed 2D facial video anamorphic projections onto discrete screens (202' thru 205') associated with each player coupled to prerecorded and/or prerendered body facsimiles (206 thru 209) optionally moving in synchronization with the real world human player resulting in a more realistic 3D Pepper's Ghost artifices of people with substantially more visual feedback information from each human player when compared to prior art avatars. Of course, as is apparent to one skilled in the art, the previous exemplary disclosed Pepper's Ghost artifices placed into a virtual 3D environment is compatible with virtually all digital interactive experiences—e.g., Augmented Reality or "AR", 2D flat screen.

Figure 2C:
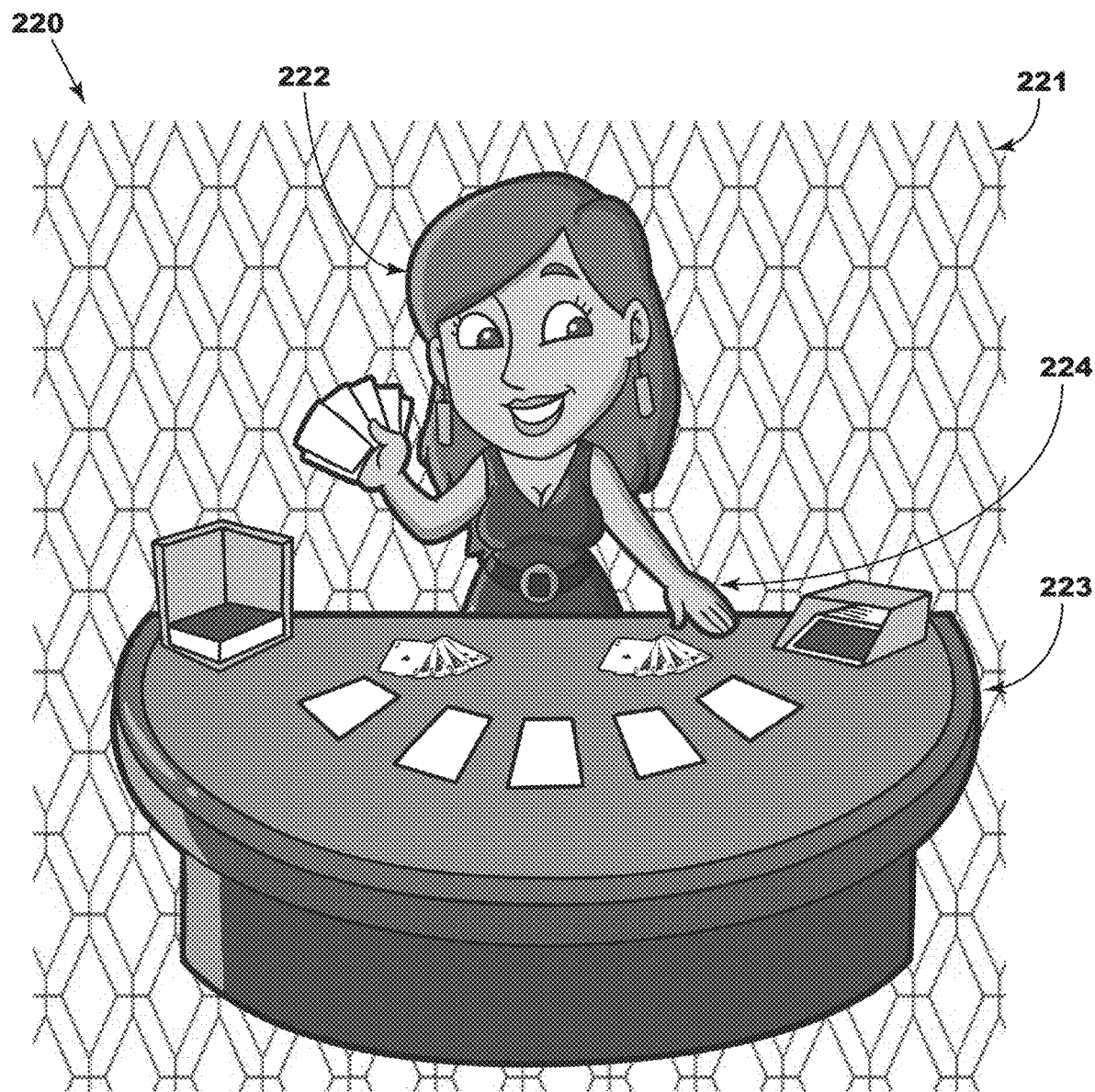
FIG. 2C is a representative example isometric view of a simulated 3D virtual casino blackjack avatar comprised of a plurality of virtual planar screen surfaces placed within a 3D virtual casino environment.
Figure 2D:
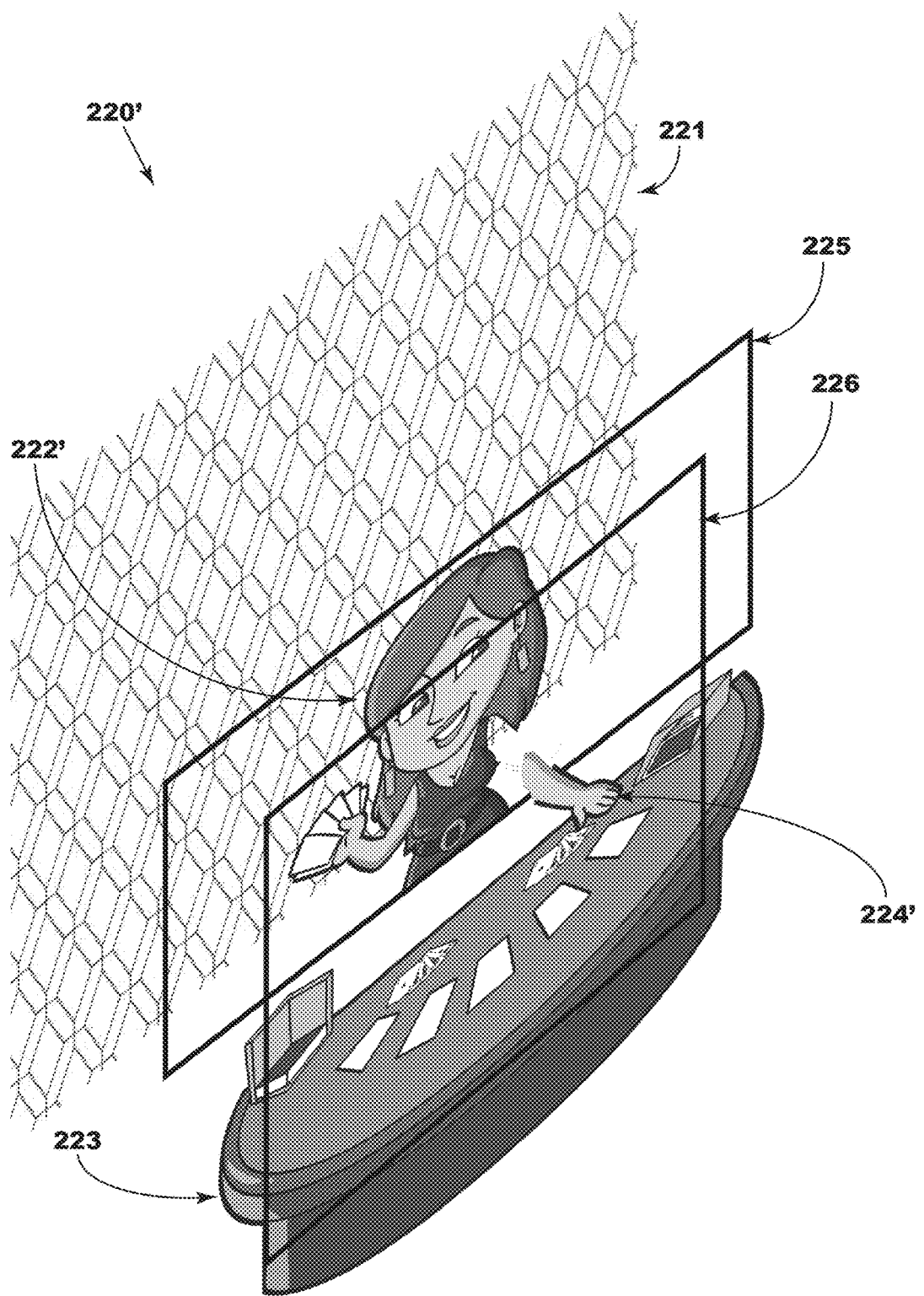
FIG. 2D is the representative example of the simulated 3D virtual casino blackjack avatar of FIG. 2C from a different perspective illustrating the plurality of planar virtual screen surfaces and associated Pepper's Ghost virtual projections placed within the 3D virtual environment.

FIGS. 2C and 2D taken together, provide an exemplary embodiment of a 3D appearing Pepper's Ghost Blackjack dealer avatar (222 and 224) that is in reality a combination of two 2D Pepper's Ghost projections onto virtual flat screens. The resulting composite 2D projected avatar Blackjack dealer images onto two virtual flat screens placed parallel in virtual space creating a 3D appearing Pepper's Ghost avatar from a 2D embodiment in a virtual 3D environment. FIG. 2C illustrating how the virtual Pepper's Ghost avatar 222 would appear to a human player and FIG. 2D displaying a different perspective of the same scene with the Pepper's Ghost parallel virtual projection screens (225 and 226) highlighted.

FIG. 2C illustrates a simulated 3D casino environment 220 with a 2D Blackjack dealer avatar (222 and 224) as seen from the perspective of a human player (not shown in FIG. 2C). The main body of the 2D Blackjack dealer avatar 222 appears in front of a 2D backdrop 221 and behind a 3D virtual gaming table 223. However, the 2D Blackjack dealer avatar's left arm 224 appears on top of the virtual gaming table 223. Thus, the Blackjack dealer avatar (222 and 224) while composed of flat 2D images nevertheless simulates a 3D appearance.

Figure 2E:
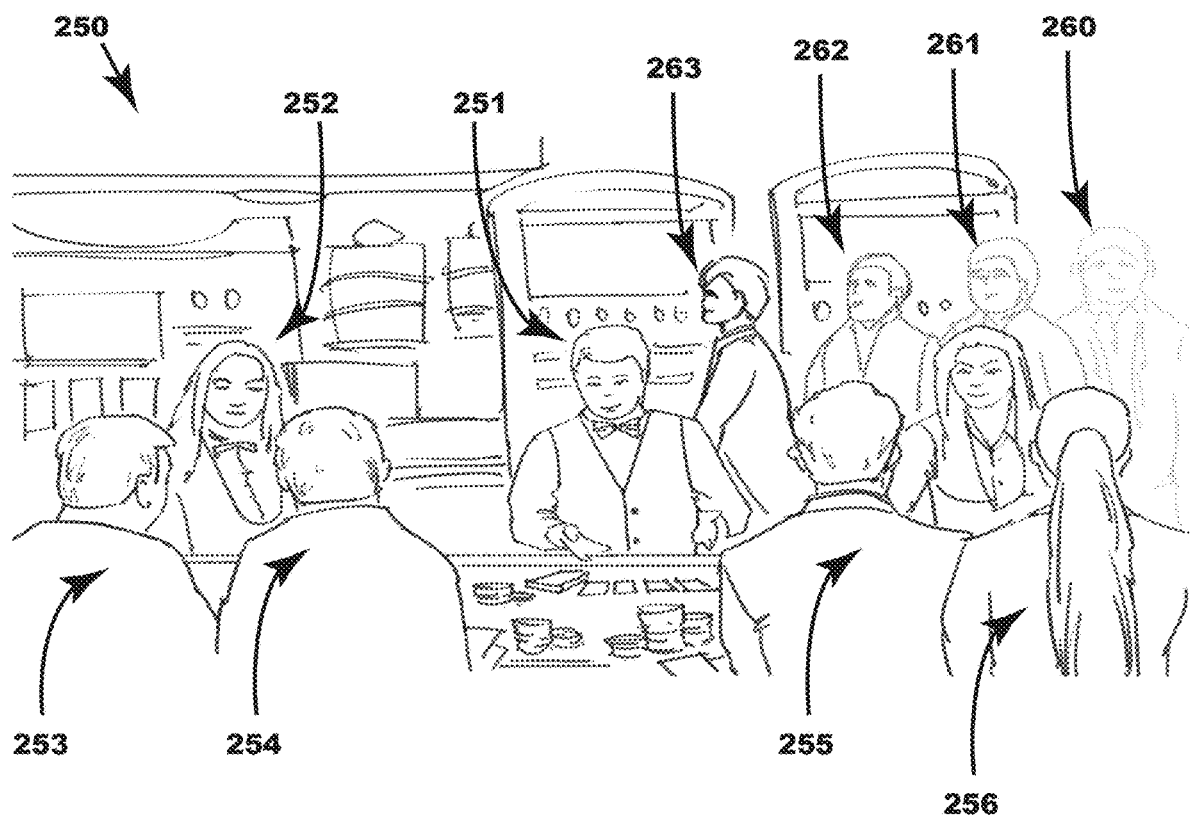
FIG. 2E is a representative example isometric view of a simulated 3D virtual casino environment including a virtual image Pepper's Ghost artifice appearing to walk through the background by sequentially displaying the artifice in a series of 2D projected live feed video images on strategically placed virtual screens.

As shown in 220' of FIG. 2E, the simulated 3D appearance of the 2D Blackjack dealer avatar (222' and 224') is accomplished with two separate projections onto two different virtual parallel Pepper's Ghost screens (225 and 226) embedded in the virtual environment. By separating the 2D Blackjack dealer avatar into two separate Pepper's Ghost projections, the screen 225 displaying the projection of the Blackjack dealer avatar's body 222' can be positioned behind the virtual gaming table 223 and in front of the 2D backdrop 221 with the screen 226 displaying the Blackjack dealer avatar's left arm 224' positioned in front of the virtual gaming table 223 in virtual 3D space. Thus, the two composite 2D Blackjack dealer avatar Pepper's Ghost projections simulate 3D depth without the burdensome bandwidth and processing requirements typical of animated 3D avatars in virtual 3D space. Again, even when displaying avatars instead of live 2D video feed images of human players, significant reduction in bandwidth and processing can be realized with pluralities of Pepper's Ghost 2D virtual projections that appear 3D in a virtual environment.

Figure 2F:
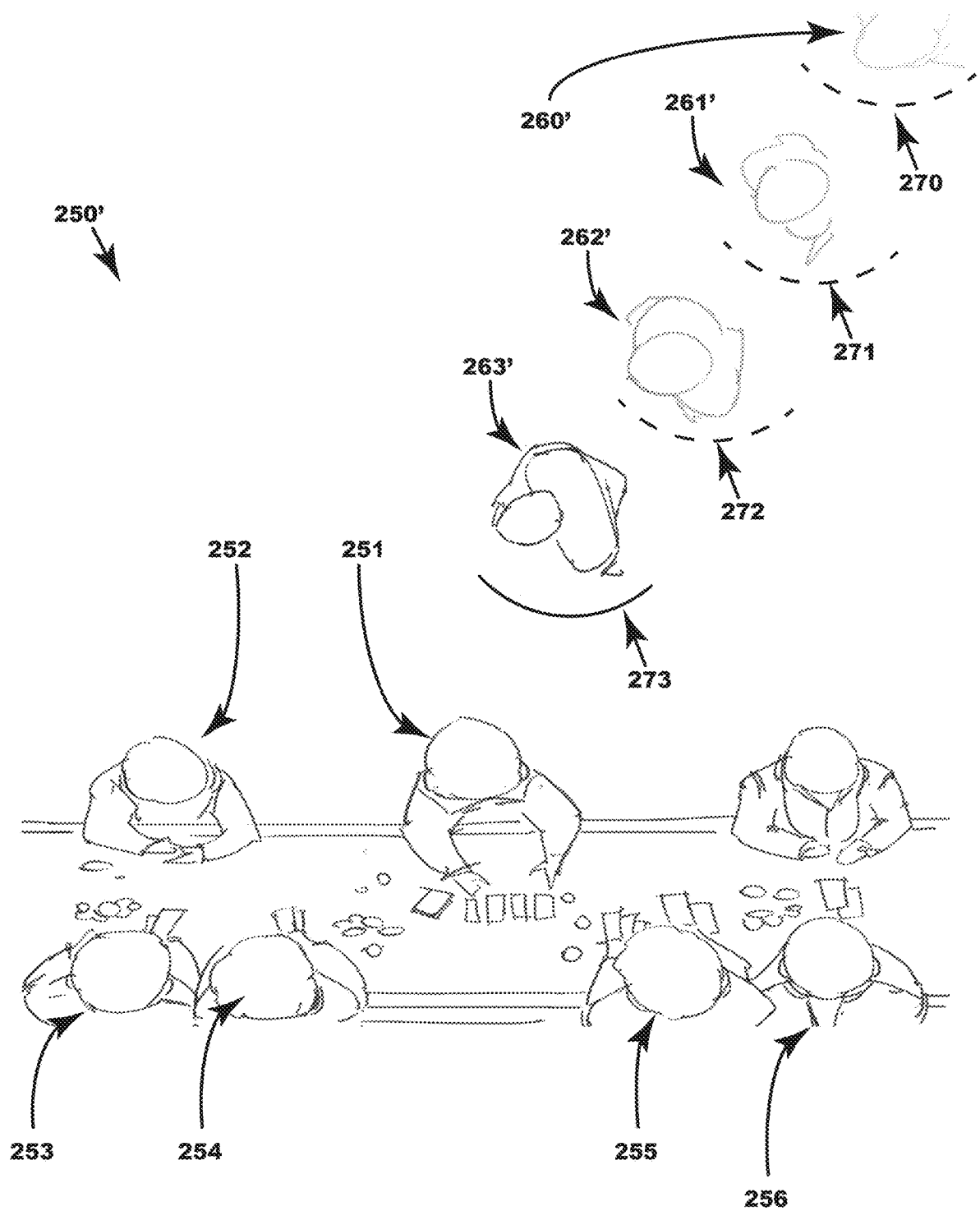
FIG. 2F shows the same representative example of FIG. 2E from a different perspective (bird's eye view) of the simulated 3D virtual casino environment highlighting the positioning of the strategically placed virtual Pepper's Ghost screens.

FIGS. 2E and 2F taken together, provide an exemplary embodiment of a simulated 3D virtual casino environment with an anamorphic 2D Pepper's Ghost artifice of a human player projected sequential onto a series of curved virtual screens creating the appearance of the human player walking through a 3D virtual casino space. FIG. 2E illustrates 250 how the walking virtual Pepper's Ghost artifice (260 thru 263) would appear in the 3D casino space and FIG. 2F displaying 250' a different perspective of the same scene with the series of Pepper's Ghost virtual projection screens (270 thru 273) highlighted.

FIG. 2E illustrates a simulated 3D casino environment 250 with a dealer avatar 251 and players (252 thru 256) as seen from the perspective of a human player (not shown in FIG. 2E). Walking in the background of FIG. 2E are a series of live human player anamorphic 2D Pepper's Ghost artifices (260 thru 263) where the series of 2D Pepper's Ghost artifices appear to be a single artifice moving through the 3D space of the virtual casino. As shown 220' in FIG. 2F, the illusion of the 2D Pepper's Ghost artifices (260' thru 263') walking through the 3D space of the virtual casino is created by spacing a series of curved virtual screens (270 thru 273) along the "walking path" of the 2D Pepper's Ghost artifice such that the anamorphic video projection of the live player sequencing through the screen series (270 thru 273) creates the illusion of a 2D Pepper's Ghost artifice moving through 3D virtual space. Similar to before, the utilization of 2D Pepper's Ghost artifices comprised of anamorphic video projections onto a series of curved virtual screens requires significantly less bandwidth and processing than attempting to move a 3D avatar (much less a 3D projection of a live human) through 3D virtual space over the same trajectory. Of course, as is apparent to one skilled in the art, the previous exemplary disclosed Pepper's Ghost artifices placed into a virtual 3D environment are compatible with virtually all digital interactive experiences—e.g., Augmented Reality or "AR", 2D flat screen.

Figure 3A:
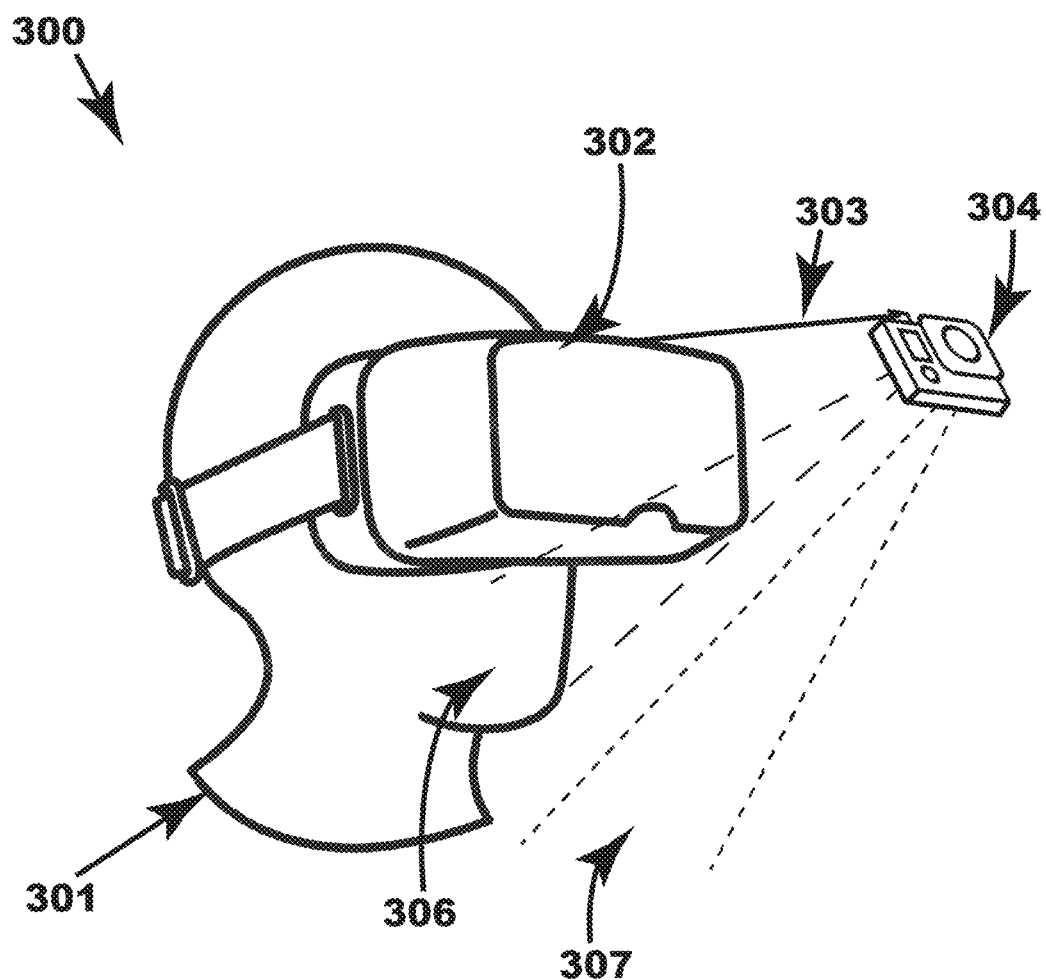
FIG. 3A is a first representative example isometric view of a VR device with an external mounted camera capable of supporting the embodiments of FIGS. 2A, 2B, 2E, and 2F.
Figure 3B:
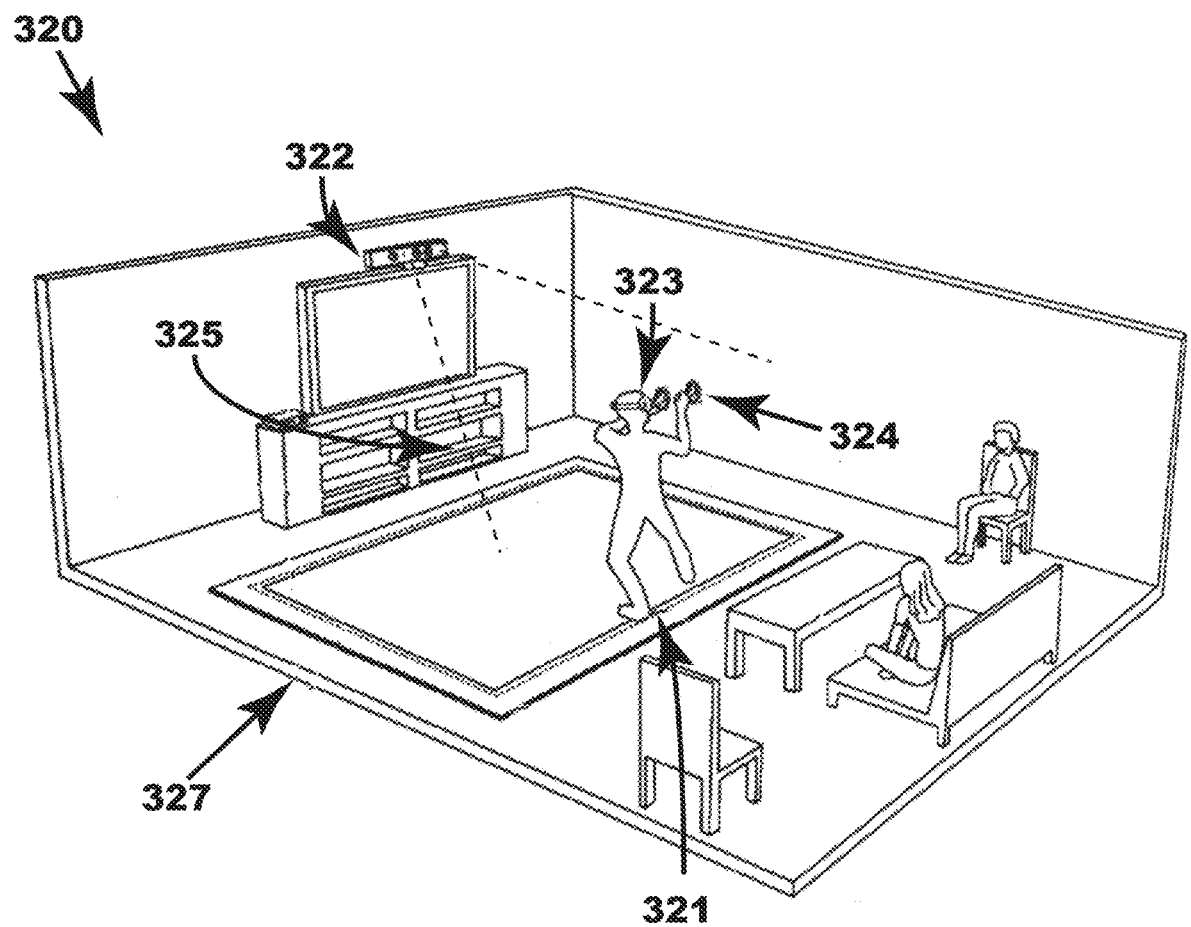
FIG. 3B is a second representative example isometric view of a VR device with an additional exterior camera capable of supporting the embodiments of FIGS. 2A, 2B, 2E, and 2F.
Figure 3C:
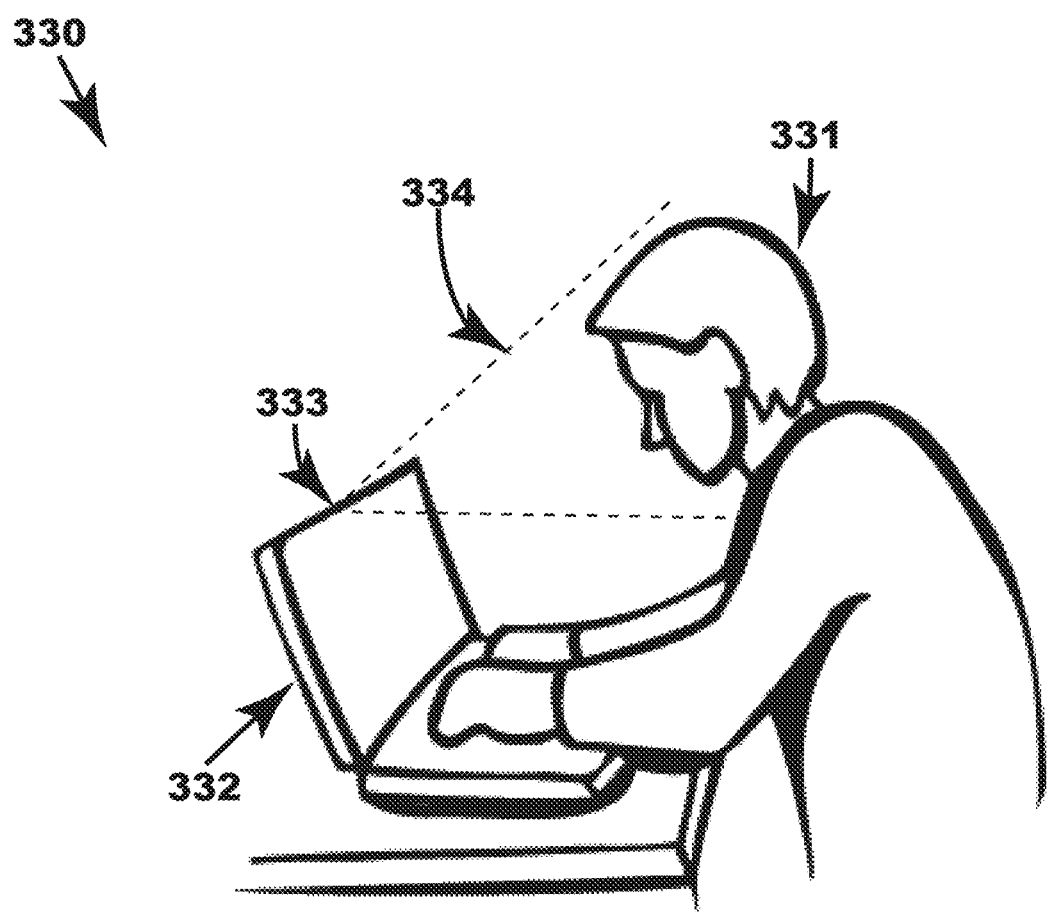
FIG. 3C is a representative example isometric view of a personal computer and user with an embedded camera capable of supporting the embodiments of FIGS. 2A, 2B, 2E, and 2F.
Figure 3D:
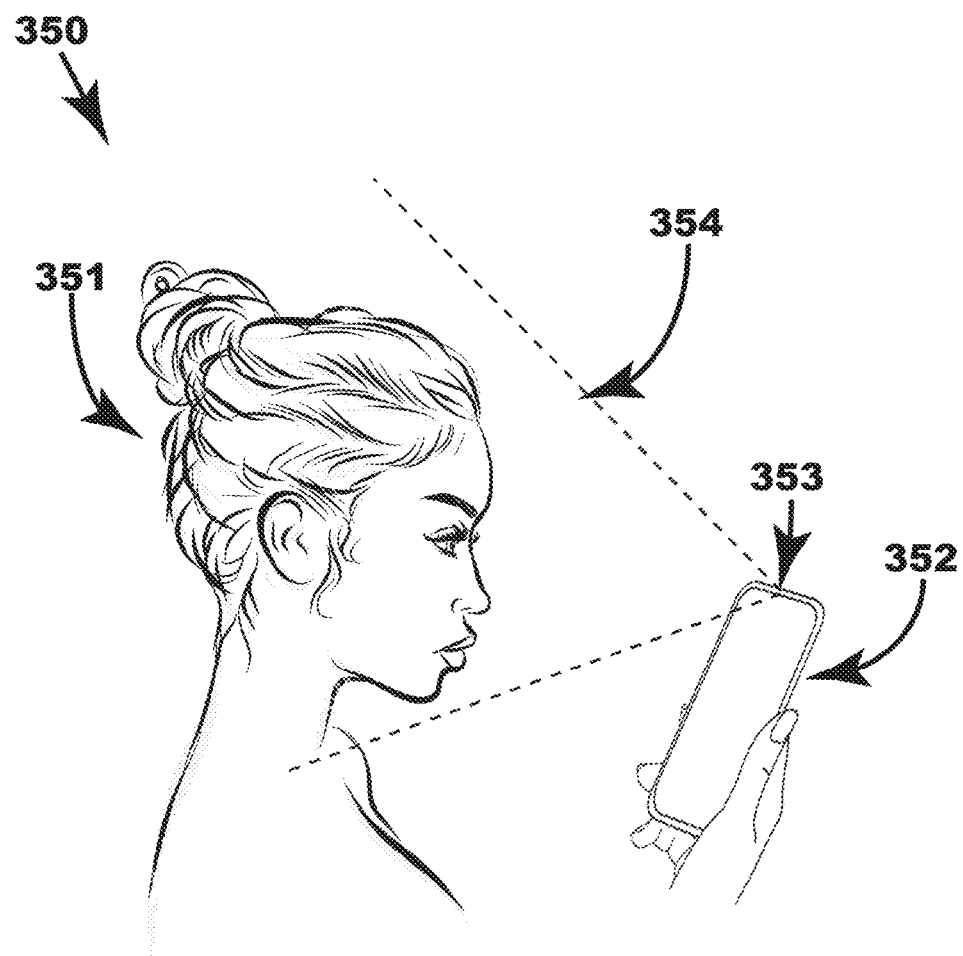
FIG. 3D is a representative example isometric view of a smart phone and user with an embedded camera capable of supporting the embodiments of FIGS. 2A, 2B, 2E, and 2F.

Having provided brief examples of how enhancements enabled by this disclosure would appear to a human observer of a simulated 3D virtual environment, FIGS. 3A thru 3D will provide examples of hardware embodiments suitable for capturing live video feeds of at least portions of human players' anatomy to be displayed as Pepper's Ghost artifices interacting with the simulated 3D environments of FIGS. 2A, 2B, 2E, and 2F. FIGS. 3A and 3B illustrate two different hardware embodiments of VR devices (300 and 320, respectively) with FIG. 3C illustrating an unmodified laptop computer 330 and FIG. 3D illustrating an unmodified smart phone 350.

FIG. 3A provides an example 300 of a modified VR headset 302 that would be capable of providing live 2D video feeds of at least portions of a human player 301 interacting with a simulated 3D virtual environment. As shown 300 in FIG. 3A, the human player 301 is wearing a VR headset 302 that is a modified exemplary embodiment compatible with this disclosure. In this exemplary embodiment, the VR headset 302 modification includes a cantilevered extension rod 303 secured to the VR helmet 302 with at least one camera 304 at the other end. The camera 304 is positioned to capture live 2D video of lower facial expressions 306 (e.g., mouth movements) and/or body motion 307. Additionally, the VR headset 302 could also optionally include internal cameras (not shown in FIG. 3A) to provide live 2D video feed of the player's eye movements. These separate live 2D video feeds can then be digitally stitched together to create at least one composite live video feed image that could be subsequently modified (e.g., anamorphic distortion) for projection as a Pepper's Ghost artifice in a virtual 3D environment as previously disclosed in FIGS. 2A, 2B, 2E, and 2F. By mounting 2D cameras in/on the VR headset 302 the perspective of the cameras relative to the human player's body remains a constant, thereby reducing computational digital stitching processing as well as providing a relatively low bandwidth real time composite feed of the human player's actions.

In contrast, FIG. 3B provides an alternative exemplary embodiment 320 where the human player 321 is wearing a VR headset 323 and his or her motions are captured 325 by at least one separate video camera 322 positioned in the same room 327 as the human player 323. Thus, in this embodiment, the player's 321 motions are captured by the at least one separate video camera 322 as a live 2D video feed and/or summary metrics of the player's 321 motions. Optionally, the player 321 may also utilize handheld controllers 324 that would most likely provide more accurate metrics of hand movements as well as provide optional additional control via handheld controller buttons. As in the previous embodiment 300 (FIG. 3A), the human player's 321 (FIG. 3B) VR headset 323 may also include optional internal cameras (not shown in FIG. 3B) to provide live 2D video feed of the player's eye movements with the separate external live 2D video feed digitally stitched together to create at least one composite live video feed image that could be subsequently modified (e.g., anamorphic distortion) for projection as a Pepper's Ghost artifice in a virtual 3D environment as previously demonstrated in FIGS. 2A, 2B, 2E, and 2F.

This is not to imply that live 2D video feeds and/or motion metrics may only be garnered by VR devices. FIGS. 3C and 3D illustrate optional embodiments (330 and 350, respectively) where live 2D video feeds are acquired 334 from a laptop computer's 332 built-in camera 333 of the player's 331 face and upper torso (FIG. 3C) as well as acquired 354 from a handheld smart phone's 352 internal camera 353 of the player's 351 face and upper torso (FIG. 3D). In both of these embodiments (330 and 350) the human players' (331 and 351) facial expressions are captured as live 2D video feeds that can be subsequently modified (e.g., anamorphic distortion) for projection as Pepper's Ghost artifices in virtual 3D environments as previously disclosed in FIGS. 2A, 2B, 2E, and 2F. Of course, in the embodiments 330 and 350 of FIGS. 3C and 3D the player's other body movements could be optionally interpolated into the virtual 3D environment by means of other control mechanisms (e.g., keyboard commands, virtual buttons, smart phone movement) than actual human body movements. In the embodiments 330 and 350 of FIGS. 3C and 3D, the background also captured by the embedded camera could be digitally removed utilizing techniques well known in the art (e.g., U.S. Pat. No. 7,676,081 "Blake et al.") further reducing bandwidth requirements. The embodiments of 330 and 350 of FIGS. 3C and 3D having the advantages of simplified off-the-shelf hardware, a single live 2D video feed requiring no digital stitching, and an undistorted view of the player's face with the disadvantages of a less immersive 3D virtual environment and the possible loss of natural body motion functioning as a Pepper's Ghost artifice controller.

Figure 4A:
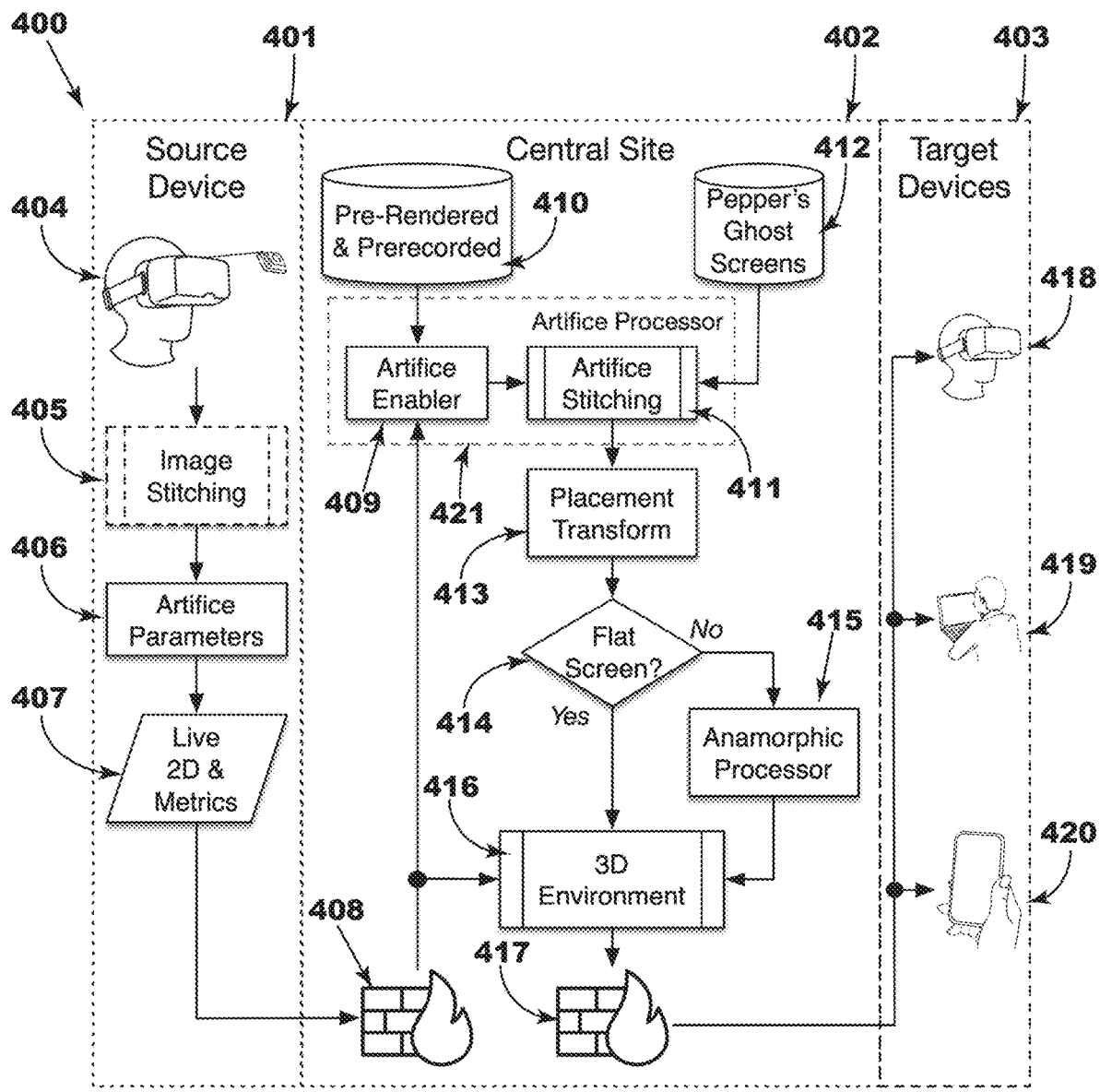
FIG. 4A is an overall swim lane flowchart representative example of the processes associated with transmitting live 2D video feeds and motion metric data from the VR devices of FIGS. 3A and 3B, creating composite Pepper's Ghost artifices utilizing the live 2D video feeds, inserting the created Pepper's Ghost artifices into a 3D virtual environment, and transmitting the 3D virtual environment with Pepper's Ghost artifices to at least one external viewing device.
Figure 4B:
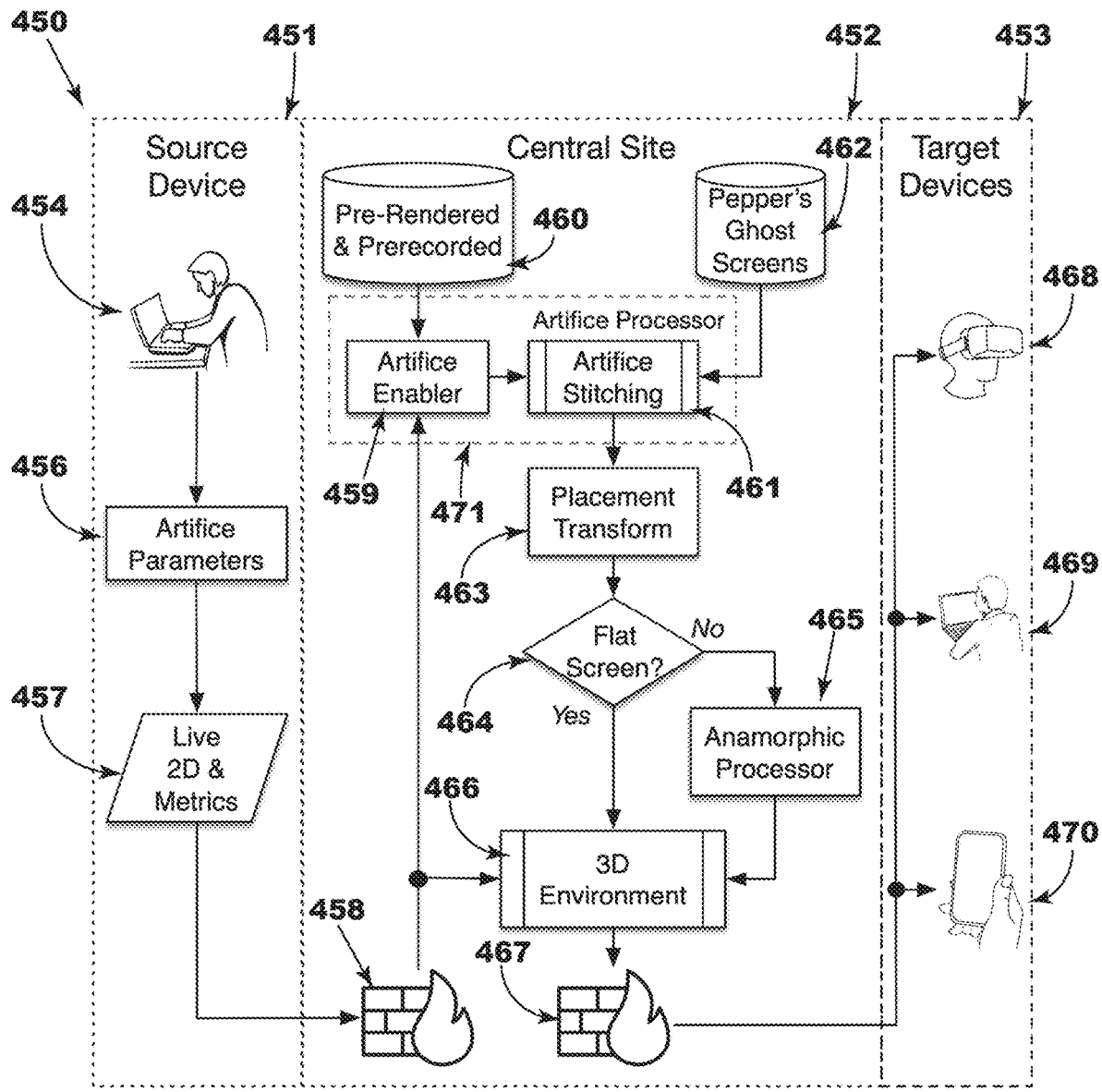
FIG. 4B is an overall swim lane flowchart representative example of the processes associated with transmitting live 2D video feeds and motion metric data from the devices of FIGS. 3C and 3D, creating composite Pepper's Ghost artifices utilizing the live 2D video feeds, inserting the created Pepper's Ghost artifices into a 3D virtual environment, and transmitting the 3D virtual environment with Pepper's Ghost artifices to at least one external viewing device.

FIGS. 4A and 4B taken together, provide detailed specific embodiments of Pepper's Ghost artifice generation systems for various different types of exemplary devices (e.g., FIGS. 3A thru 3D) utilized to embed live 2D video feeds and/or human player motion metrics into a 3D virtual environment. FIG. 4A illustrates an exemplary embodiment of generating Pepper's Ghost artifices from VR source devices (e.g., FIGS. 3A and 3B) while FIG. 4B illustrates the Pepper's Ghost artifice generation system originating from 2D personal computing or AR devices (e.g., FIGS. 3C and 3D).

In the exemplary embodiments 400 and 450 of FIGS. 4A and 4B, the 2D video feeds and/or human player motion metrics data flow left-to-right with both embodiments (400 and 450) conceptually divided into three swim lanes (i.e., Source Device 401/451, Central Site 402/452, and Target Devices 403/453). If a particular flowchart function appears completely within a swim lane, its functionality is limited to the data category of the associated swim lane e.g., the Artifice Enabler 409/459 is a function of the Central Site 402/452. By dividing both embodiments (400 and 450) into three separate swim lanes, the flow of the data ultimately creating the Pepper's Ghost artifice in a 3D virtual environment becomes apparent with the 2D video feeds and/or human player motion metrics data originating with the Source Device 401/451, being processed by the Central Site 402/452, and ultimately appearing as Pepper's Ghost artifices in a 3D virtual environment when viewed by the Target Devices 453.

FIG. 4A begins 400 with the 2D video feeds and/or human player motion metrics necessary for constructing Pepper's Ghost artifices being acquired by a video camera and/or VR headset 404. As illustrated in FIG. 4A, the VR headset 404 may be optionally equipped with at least one camera focused on the human player as disclosed 300 in FIG. 3A or alternatively be comprised of a separate VR headset 323 and handheld controllers 324 (FIG. 3B) with one or more external cameras 322 focused on the human player. Regardless of the VR headset 404 (FIG. 4A) configuration, the 2D video feed(s) and/or human player motion metrics data originates with the VR headset 404 and optional cameras. As discussed in the FIG. 3A disclosure 300, an optional camera may be embedded in the VR headset itself 302 focused on the human player's eye movements.

As the 2D video feed(s) and/or human player motion metrics data is acquired in real time the data preferably first undergoes preliminary signal processing in the Source Device 401 (FIG. 4A) itself. If a plurality of 2D cameras were employed in video data acquisition, an optional Image Stitching function 405 could be first utilized. This optional Image Stitching function 405 would seamlessly blend the 2D video from different cameras into one coherent video feed—e.g., separate eye and facial 2D video feeds, as disclosed 300 in FIG. 3A, may be digitally stitched together to create a homogeneous 2D video facial feed of the human player.

After any optional Image Stitching process 405 (FIG. 4A) is completed, motion metrics (e.g., accelerometer data, gyroscopic data, compass data, locational data) garnered from the VR headset and optional handheld controllers are first categorized (e.g., left-hand motion and position, right-hand motion and position, head motion and position, body stature and location) by an Artifice Parameters 406 function. This Artifice Parameters 406 function preprocesses and packages the categorized motion metrics data into a format where the Central Site 402 can readily select the optimal virtual Screen 412 as well as any Pre-Rendered and/or Prerecorded 410 body facsimiles to be utilized in conjunction with the 2D video feed(s) and/or human player motion metrics data in creating Pepper's Ghost artifices. Optionally and preferably, the Artifice Parameters 406 function embeds metadata motion metric data into any 2D live video data feed in a format that is readily decipherable by the Central Site 402.

Finally, the Live 2D & Metrics function 407 authenticates the Source Device 401 to the Central Site 402 and transmits the preprocessed 2D video feed(s) and/or human player motion metrics data to the Central Site's 402 Firewall 408. This Source Device 401 authentication process includes uniquely identifying the human player wearing the VR headset 404 to the Central Site 402, thereby facilitating optimal selection of any custom Pre-Rendered and/or Prerecorded 410 body facsimiles and or virtual screens 412.

Once the Central Site's 402 Firewall 408 receives the authenticated and preprocessed 2D video feed(s) and/or human player motion metrics and identity data, it forwards the data to Artifice Processor 421, which is comprised of Artifice Enabler 409 and Artifice Stitching 411 functions. The Artifice Enabler 409 function allows Pre-Rendered and/or Prerecorded 410 body facsimile selection and consequent Pepper's Ghost artifice construction with the Artifice Stitching function 411 blending the received 2D video feed(s) and any selected body facsimile parts into a coherent whole that is compatible with the motion metrics and virtual screen(s) selected from the Pepper's Ghost Screens database 412 library. Preferably, for enhanced security considerations, the Firewall 408 also performs a stateful inspection of the incoming data confirming that it is structured within predefined parameters.

The Artifice Enabler 409 function executes Pre-Rendered and/or Prerecorded 410 body facsimile selection (preferably based at least partially on the received identity data) as well as providing selection of the correct virtual screen (e.g., male topographical face, female topographical face, male body, female body) for the finally created Pepper's Ghost artifice. It then passes the received 2D video feed(s) and/or human player motion metrics and any retrieved Pre-Rendered and/or Prerecorded 410 body facsimile selections as well as virtual screen suggestion to the Artifice Stitching function 411. This Artifice Stitching function 411 seamlessly blends the received 2D video feed(s) and any selected body facsimile parts into a coherent whole that is compatible with the motion metrics and virtual screen(s) selected from the Pepper's Ghost Screens database 412 library. The Artifice Stitching function 411 then passes the harmonized stitched artifice and associated virtual screen(s) to the Placement Transform function 413.

The Placement Transform function 413 is cognizant of the virtual 3D Environment 416 that the newly created harmonized Pepper's Ghost artifice will be placed into and calculates the correct location and perspectives for the Pepper's Ghost artifice and associated selected virtual screen(s) to be positioned within the virtual 3D Environment 416. Prior to digitally placing the Pepper's Ghost artifice and associated virtual screen(s) into the 3D virtual environment a logic test 414 is performed to determine if the selected virtual screen(s) is/are flat or a topographical or irregular surface. If the selected virtual screen(s) is/are flat, no further processing is necessary and the Pepper's Ghost artifice and associated virtual screen(s) are inserted into the overall virtual 3D Environment 416. However, if the associated virtual screen(s) is/are comprised of a topographical or irregular surface, a separate Anamorphic Processor function 415 will be executed to distort the 2D video feed(s) and any selected body facsimiles such that when viewed on the selected virtual screen(s) appear to be undistorted. This process is continually repeated so long as additional 2D video feed(s) and/or human player motion metrics are received at the Central Site 402 from the Source Device 401.

When the Pepper's Ghost artifice and associated virtual screen(s) are inserted into the overall virtual 3D Environment 416, continuous updates compliant with the received data from the Source Device 401 are added to the 3D Environment 416, ultimately transmitted through the Central Site's 402 Firewall 417 to at least one other Target Device 403 e.g., second VR device 418, laptop computer 419, smart phone 420. As can be appreciated by an artisan in terms of this disclosure, these types of continuous real time 3D Environment 416 updates are typically not possible, due to bandwidth limitations, with prior art 3D modeling. However, the substantial real time data reduction requirements enabled by this disclosure of only transmitting 2D images and associated virtual screen data as well as placement within the virtual 3D Environment 416, typically enable a plurality of human player 2D video feed(s) to all interact in the same virtual 3D environment with only modest bandwidth requirements. Of course, as illustrated in FIGS. 2C and 2D, the reduction in bandwidth achieved by implementing Pepper's Ghost projections in a virtual 3D environment may also be applied to 2D avatars with the corresponding reduction in bandwidth accomplished by maintaining 2D Pepper's Ghosts projections rather than the topographical data requirements of sustaining 3D avatars.

Similar to the previous embodiment 400, the exemplary embodiment 450 of FIG. 4B begins with the 2D live video feed(s) and/or human player motion metrics necessary for constructing Pepper's Ghost artifices being acquired by a video camera from a laptop 454 or smart phone (not shown in FIG. 4B). As illustrated in FIG. 4B, the laptop 454 or smart phone are typically equipped with at least one camera focused on the human player as disclosed in FIGS. 3C and 3D (330 and 350, respectively). Regardless of the acquiring mechanism, the 2D video camera(s) is typically focused on the human player's face and upper torso. As is well-known in the art, prior art algorithms may be employed to filter out the background from the player's face and upper torso thereby only including the human player's face and/or upper torso in the 2D live video feed(s) to be utilized as the visible projected portion of a Pepper's Ghost artifice in a 3D virtual environment. This live 2D video feed(s) being ideally suited for projection onto seated Pepper's Ghost artifices around a table (e.g., FIGS. 2A and 2B—200 and 200', respectively) and/or coupled to Pre-Rendered or Prerecorded 460 (FIG. 4B) body within the 3D environment as shown in FIGS. 2E and 2F (250 and 250', respectively). However, in this embodiment 450 of FIG. 4B, the motion metrics transmitted to the Central Site 452 typically will be a combination of actual human player head motion as well as keyboard, mouse, touchpad, or smartphone (e.g., tilting or rotating the phone generating accelerometer data, touch screen input) control input.

Next, the Artifice Parameters 456 function preprocesses and packages any motion metrics data into a format where the Central Site 452 can readily select the optimal virtual Screen 462 as well as any Pre-Rendered and/or Prerecorded 460 body facsimiles to be utilized in conjunction with the 2D video feed(s) and/or motion metrics data in creating Pepper's Ghost artifices. Optionally and preferably, the Artifice Parameters 456 function embeds metadata motion metric data into any 2D live video data feed in a format that is readily decipherable by the Central Site 452.

Finally, the Live 2D & Metrics function 457 authenticates the Source Device 451 to the Central Site 452 and transmits the preprocessed 2D video feed(s) and/or motion metrics data thru the Central Site's 452 Firewall 458. This Source Device 451 authentication process includes uniquely identifying the human player using the Source Device 451 to the Central Site 452, thereby enabling optimal selection of any custom Pre-Rendered and/or Prerecorded 460 body facsimiles and/or virtual screens 462.

Once the Central Site's 452 Firewall 458 receives the authenticated and preprocessed 2D video feed(s) and/or human player motion metrics and identity data, it forwards the data to Artifice Processor 471, which is comprised of Artifice Enabler 459 and Artifice Stitching 461 functions. The Artifice Enabler 459 function allows Pre-Rendered and/or Prerecorded 460 body facsimile selection and consequent Pepper's Ghost artifice construction with the Artifice Stitching function 461 blending the received 2D video feed(s) and any selected body facsimile parts into a coherent whole that is compatible with the motion metrics and virtual screen(s) selected from the Pepper's Ghost Screens database 462 library. Preferably, for enhanced security considerations, the Firewall 458 also performs a stateful inspection of the incoming data confirming that it is structured within predefined parameters.

The Artifice Enabler 459 function executes Pre-Rendered and/or Prerecorded 460 body facsimile selection (preferably based at least partially on the received identity data) as well as providing selection of the correct virtual screen (e.g., male topographical face, female topographical face, male body, female body) for the ultimately generated Pepper's Ghost artifice. It then passes the received 2D video feed(s) and/or motion metrics and any retrieved Pre-Rendered and/or Prerecorded 460 body facsimile selections as well as the virtual screen suggestion to the Artifice Stitching function 461. This Artifice Stitching function 461 seamlessly blends the received 2D video feed(s) and any selected body facsimile into a coherent whole that is compatible with the motion metrics and virtual screen(s) selected from the Pepper's Ghost Screens database 462 library. The Artifice Stitching function 461 then passes the homogeneous stitched artifice to the Placement Transform function 463.

The Placement Transform function 463 is cognizant of the virtual 3D Environment 466 that the newly created homogeneous Pepper's Ghost artifice will be placed into and calculates the correct location and perspectives for the Pepper's Ghost artifice and associated selected virtual screen(s) to be positioned within the virtual 3D Environment 466. Prior to digitally placing the Pepper's Ghost artifice and associated virtual screen(s) into the 3D virtual environment a logic test 464 is performed to determine if the selected virtual screen(s) is/are flat or a topographical or irregular surface. If the selected virtual screen(s) is/are flat, no further processing is necessary and the Pepper's Ghost artifice and associated virtual screen(s) are inserted into the overall virtual 3D Environment 466. However, if the associated virtual screen(s) is/are comprised of a topographical or irregular surface, a separate Anamorphic Processor function 465 will be employed to distort the 2D video feed(s) and any selected body facsimiles such that when viewed on the selected virtual screen(s) appear to be undistorted. This process is continually repeated so long as additional 2D video feed(s) and/or human player motion metrics are received at the Central Site 452 from the Source Device 451.

When the Pepper's Ghost artifice and associated virtual screen(s) are inserted into the overall virtual 3D Environment 466, continuous updates conforming to the data received from the User Device 451 are inserted into the 3D Environment 466, ultimately transmitted through the Central Site's 452 Firewall 467 to at least one other Target Device 453 e.g., VR device 468, laptop computer 469, smart phone 470. As before, these types of continuous real time 3D Environment 466 updates are typically not possible, due to bandwidth limitations, with prior art 3D modeling. However, the substantial real time data reduction requirements enabled by this disclosure by only transmitting 2D images, motion metrics, and associated virtual screen data as well as location within the virtual 3D Environment 466 typically enable a plurality of human player 2D video feed(s) to all interact in the same virtual 3D environment with only modest bandwidth requirements.

Of course, as is apparent to one skilled in the art in lieu of this disclosure, there are other Pepper's Ghost virtual 3D environment embodiments (e.g., at least one 2D live video feed without any associated motion metrics data, motion metrics data controlling an avatar without any live video feed) that may under some circumstances be preferable while still resulting in significant reduction in bandwidth utilization.

With all of the previous embodiments it is preferable that the Pepper's Ghost system be cognizant of specific details of the user operating the source device, the source device itself, and the Pepper's Ghost screens deployed to display the artifices and/or associated avatar. Ideally, the Pepper's Ghost system cognizance should be portable from one user device to another and/or one central site platform to another with the cognizance tracking following the user rather than a specific device or central site system. Fortunately, the well-known blockchain enabled Non-Fungible Token (NFT) technology provides a portable methodology for recording a specific user's history and data across multiple devices and platforms.

Figure 5:
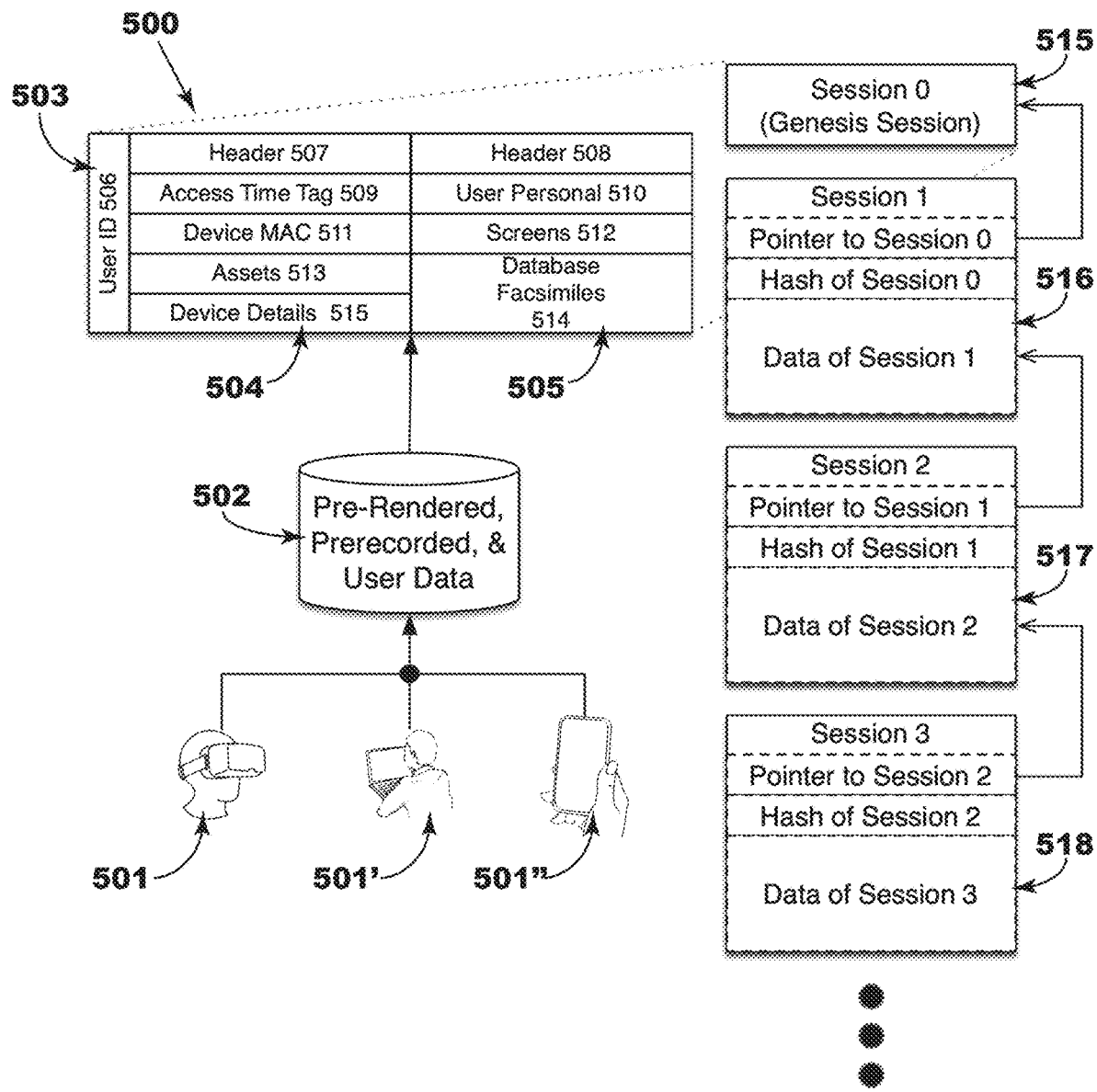
FIG. 5 is a representative example block diagram of a Non-Fungible Token (NFT) embedded in a blockchain embodying specific user, device, and screen data for utilization in the disclosures of FIGS. 4A and 4B.

FIG. 5 illustrates a representative example block diagram of a NFT embedded in a blockchain embodying a specific user, device, and screen data for utilization in the disclosures of FIGS. 4A and 4B. As previously disclosed, each user of the Pepper's Ghost system is maintained in a specific database (e.g., 410 of FIG. 4A and 460 of FIG. 4B) that is accessed for pre-rendered and/or prerecorded body facsimile selections, details about the user's device, details about the user. Additionally, there are separate related databases (e.g., 412 of FIG. 4A and 462 of FIG. 4B) that maintain virtual Pepper's Ghost screens. Furthermore, every time an user accesses the Pepper's Ghost system he or she and their respective device is authenticated with the system.

Hence, the history of each user accessing the Pepper's Ghost system can be construed by maintaining a forensic record of the user's authentication, the user's devices, and the database entries retrieved and/or modified for each access. Therefore, maintaining a log of every time a given user authenticated and a database was accessed or altered would essentially provide an audit structure for the entire life of each as well as provide a conclusive history for security and troubleshooting purposes. By encapsulating this audit structure as a NFT which is saved into a hash chain or blockchain the resulting forensic audit not only becomes complete but also unalterable.

FIG. 5 provides a representative example of optionally linking every access from a given user to part of a NFT 500. In the example of FIG. 5, every time an user (501, 501', and 501") accesses a central site database 502 a NFT session 503 is created. In this example, each session 503 includes three different categories of data containing: (1) user authentication information 506, (2) user's device authentication information 504, and (3) and database 502 entity configuration 505 at the time of the access. Additionally, each session 503 can be sorted by: (a) the ID 506 of the user (501, 501', and 501") accessing a database 502 at a given time 509, (b) the user's (501, 501', and 501") device 511 accessing the database 502 at a given time 509, and (c) the portions of the database 502 (510, 512, 514) that were accessed at a given time 509. Each session's 503 structure is also arranged such that the user's (501, 501', and 501") device and the database 502 portions are partitioned in their own discrete columns or silos (504 and 505, respectively) with separate, but related unique Headers 507 and 508 automatically generated by the NFT server for each column (504 and 505), thereby enabling identification of each session 503 of user (501, 501', and 501") and device authentication 504 as well as the database 505 data. A Time Tag 509 as well as user computing device Media Access Control or "Mac" address 511 is also provided in column 504 enabling the option of separate and discrete tracking of the user's (501, 501', and 501") device 504 and any associated Assets 513 that may be utilized to alter the user's Pepper's Ghost artifice's appearance. Finally, the database 502 portions accessed (510 thru 514) when this session 503 is in progress are also maintained in the NFT session 503.

In the example of FIG. 5, each session 503 can be saved into a blockchain 515 with the very first (root) session for a given user (501, 501', and 501") becoming "Session 0" or the "Genesis Session". The next subsequent session 516 would include a pointer to the previous (Genesis Session) as well as a cryptographic hash (e.g., Secure Hash Algorithm at 256-bits or "SHA-256") of the previous session 515 in the blockchain as well as its own session data. This blockchain process will continue as subsequent sessions (517 and 518) occur for the same user (501, 501', and 501") with each session essentially linked to all previous sessions in a manner such that no historical data can be altered without disturbing the integrity of the hash chain or blockchain. Thus, by maintaining the disclosed session 503 NFT structure in a blockchain its historical integrity is assured and becomes therefore suitable for forensic audits of the high integrity typically required of the gambling or gaming industry.

Since each blockchain contains no sensitive data (e.g., user authentication data would be embodied as a cryptographic hash), the blockchain can be freely duplicated and distributed whenever a new session is added. For example, the user's device and each Pepper's Ghost central site accessed can each maintain a copy of the blockchain. If any discrepancy arises between any parties holding copies of the blockchain it can easily be resolved by all parties adopting the longest blockchain of record.

Of course, as is apparent to one skilled in the art in lieu of this disclosure, utilizing NFTs to maintain historical integrity and enable possible forensic audits is not necessarily limited to virtual or augmented systems employing Pepper's Ghost systems. NFTs may be employed to maintain a cognizant identity of a given user and device with higher bandwidth virtual and augmented reality embodiments thereby allowing a user to maintain an identity despite changing avatars or other artifices appearance from time-to-time or environment-to-environment.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A method for using data from a source device to create a three-dimensional (3D) appearing Pepper's Ghost artifice in a 3D virtual environment at a central site for distribution to a plurality of remote target devices, the central site including (i) a database that stores a plurality of virtual screens of varying sizes and shapes, and (ii) an artifice processor, the method comprising:
  (a) generating by the source device:
    (i) motion metric data of a human, and
    (ii) at least one 2D live video feed of the human;
  (b) transmitting by the source device to the central site:
    (i) the motion metric data of the human,
    (ii) the at least one 2D live video feed of the human, and
    (iii) a unique identifier of the human;
  (c) enabling and stitching, by the artifice processor at the central site, a Pepper's Ghost artifice of the human using the motion metric data of the human, the at least one 2D live video feed of the human, and the unique identifier of the human received from the source device;
  (d) selecting, at the central site, at least one virtual screen using the Pepper's Ghost artifice of the human, the selected virtual screen being compatible with the at least one 2D live video feed of the human; and
  (e) the central site transmitting the Pepper's Ghost artifice of the human and the selected at least one compatible virtual screen to one or more of the remote target devices for projection of the Pepper's Ghost artifice of the human onto the selected at least one compatible virtual screen, thereby creating a 3D appearing Pepper's Ghost artifice in a 3D virtual environment at each of the one or more remote target devices.

2. The method of claim 1 wherein the source device is a Virtual Reality (VR) headset, and the motion metric data of the human are generated by the VR headset.

3. The method of claim 2 wherein the motion metric data of the human generated by a Virtual Reality (VR) headset include accelerometer data.

4. The method of claim 1 wherein the source device is a laptop, and the motion metric data of the human are generated by the laptop.

5. The method of claim 4 wherein the motion metric data of the human generated by the laptop are derived from keyboard inputs.

6. The method of claim 4 wherein the motion metric data of the human generated by the laptop are derived from head motions of the human as detected by a camera of the laptop.

7. The method of claim 1 wherein the source device is a smart phone, and the motion metric data of the human are generated by the smart phone.

8. The method of claim 7 wherein the motion metric data of the human generated by the smart phone are accelerometer data derived from the human subject's hand motions as detected by an accelerometer of the smart phone.

9. The method of claim 1 wherein the motion metric data of the human includes head motion, position, and body stature data.

10. The method of claim 1 wherein the source device further transmits to the central site:
  (iv) source device authentication data of the at least one 2D live video feed,
wherein the artifice processor at the central site further uses the device authentication data to assemble the Pepper's Ghost artifice of the human.

11. The method of claim 1 wherein the plurality of virtual screens that are stored in the database of the central site are recorded in session-based Non-Fungible Tokens (NFTs) that are archived in a blockchain.

12. The method of claim 1 wherein step (c) includes selecting pre-rendered or prerecorded body facsimiles to be included in the Pepper's Ghost artifice stitching.

13. The method of claim 1 wherein the unique identifier of the human is recorded in session-based Non-Fungible Tokens (NFTs) that are archived in a blockchain.

14. The method of claim 10 wherein the source device authentication data of the at least one 2D live video feed is recorded in session-based Non-Fungible Tokens (NFTs) that are archived in a blockchain.

* * * * *